United States Patent
Parikh et al.

(10) Patent No.: US 8,879,883 B2
(45) Date of Patent: Nov. 4, 2014

(54) OPTICAL FIBER CABLE INLET DEVICE AND TELECOMMUNICATIONS ENCLOSURE SYSTEM

(75) Inventors: Rutesh D. Parikh, Austin, TX (US); William G. Allen, Austin, TX (US); Kenneth D. Rebers, Austin, TX (US); Joseph M. Van Allen, Cedar Park, TX (US); George W. Parrett, Austin, TX (US); Thomas E. Bludau, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 1119 days.

(21) Appl. No.: 12/527,995

(22) PCT Filed: Mar. 14, 2008

(86) PCT No.: PCT/US2008/057010
§ 371 (c)(1), (2), (4) Date: Aug. 20, 2009

(87) PCT Pub. No.: WO2008/115795
PCT Pub. Date: Sep. 25, 2008

(65) Prior Publication Data
US 2010/0086260 A1    Apr. 8, 2010

Related U.S. Application Data

(60) Provisional application No. 60/895,233, filed on Mar. 16, 2007, provisional application No. 60/895,247, filed on Mar. 16, 2007, provisional application No. 60/946,311, filed on Jun. 26, 2007.

(51) Int. Cl.
*G02B 6/36* (2006.01)
*G02B 6/44* (2006.01)

(52) U.S. Cl.
CPC ............ *G02B 6/4442* (2013.01); *G02B 6/4444* (2013.01); *G02B 6/3636* (2013.01); *G02B 6/4477* (2013.01)
USPC .......................................... 385/138; 385/135

(58) Field of Classification Search
USPC ......................................... 385/134, 135, 147
See application file for complete search history.

(56) References Cited

U.S. PATENT DOCUMENTS

| | | | |
|---|---|---|---|
| 4,805,979 A | 2/1989 | Bossard et al. | |
| 4,857,672 A | 8/1989 | Rebers et al. | |

(Continued)

FOREIGN PATENT DOCUMENTS

| | | |
|---|---|---|
| EP | 0 589 618 A1 | 3/1994 |
| JP | 61-267007 | 11/1986 |

(Continued)

OTHER PUBLICATIONS

Cobb, G.S., et al.; "Fiber-to-the-Home Update: Drop Installation Flexibility", *International Wire & Cable Symposium Proceedings* (1989); pp. 149-154.

(Continued)

*Primary Examiner* — Mike Stahl
(74) *Attorney, Agent, or Firm* — Janet A. King

(57) ABSTRACT

An inlet device is described for inserting a cable containing optical fibers into a telecommunications enclosure. The inlet device includes a housing with a strength member securing section configured to fasten at least one strength member to the housing. The inlet device further includes a fiber guide device. The inlet device may be used in a single fiber optical cable assembly or multi-fiber optical cable assembly. A method for preparing a cable assembly is also described. A telecommunications enclosure including an inlet device is also described.

16 Claims, 27 Drawing Sheets

(56) References Cited

U.S. PATENT DOCUMENTS

| | | | |
|---|---|---|---|
| 5,042,901 A | 8/1991 | Merriken et al. | |
| 5,199,095 A * | 3/1993 | Iapicco | 385/100 |
| 5,231,688 A | 7/1993 | Zimmer | |
| 5,416,874 A | 5/1995 | Giebel et al. | |
| 5,598,500 A | 1/1997 | Crespel et al. | |
| 5,689,607 A | 11/1997 | Vincent et al. | |
| 5,793,920 A | 8/1998 | Wilkins et al. | |
| 5,838,861 A | 11/1998 | Bunde | |
| 5,943,462 A | 8/1999 | Schofield et al. | |
| 6,028,974 A * | 2/2000 | Shyu et al. | 385/100 |
| 6,269,214 B1 | 7/2001 | Naudin et al. | |
| 6,278,831 B1 | 8/2001 | Henderson et al. | |
| 6,434,315 B1 | 8/2002 | Grois et al. | |
| 6,466,725 B2 | 10/2002 | Battey et al. | |
| 6,487,344 B1 | 11/2002 | Naudin et al. | |
| 6,738,555 B1 | 5/2004 | Cooke et al. | |
| 6,778,752 B2 | 8/2004 | Laporte et al. | |
| 6,856,748 B1 | 2/2005 | Elkins, II et al. | |
| 6,909,828 B2 | 6/2005 | Zimmel et al. | |
| 7,035,510 B2 | 4/2006 | Zimmel et al. | |
| 7,090,407 B2 | 8/2006 | Melton et al. | |
| 7,113,679 B2 | 9/2006 | Melton et al. | |
| 7,136,555 B2 | 11/2006 | Theuerkorn et al. | |
| 7,146,090 B2 | 12/2006 | Vo et al. | |
| 7,147,384 B2 | 12/2006 | Hardcastle et al. | |
| 7,260,301 B2 | 8/2007 | Barth et al. | |
| 7,266,274 B2 | 9/2007 | Elkins, II et al. | |
| 7,292,763 B2 | 11/2007 | Smith et al. | |
| 7,333,708 B2 | 2/2008 | Blackwell, Jr. et al. | |
| 2002/0141724 A1 | 10/2002 | Ogawa et al. | |
| 2003/0210875 A1 | 11/2003 | Wagner et al. | |
| 2004/0240793 A1 | 12/2004 | Kerry | |
| 2005/0207711 A1 | 9/2005 | Vo et al. | |
| 2006/0067637 A1 | 3/2006 | Carpenter et al. | |
| 2006/0120672 A1 | 6/2006 | Cody et al. | |
| 2006/0133758 A1 | 6/2006 | Mullaney et al. | |
| 2006/0147172 A1 | 7/2006 | Luther et al. | |
| 2006/0153517 A1 | 7/2006 | Reagan et al. | |
| 2006/0263029 A1 | 11/2006 | Mudd et al. | |
| 2006/0269208 A1 | 11/2006 | Allen et al. | |
| 2006/0269209 A1 | 11/2006 | Mullaney et al. | |
| 2006/0275006 A1 | 12/2006 | Xin | |
| 2007/0025677 A1 | 2/2007 | Harrison et al. | |
| 2007/0189695 A1 | 8/2007 | Bludau et al. | |
| 2008/0013888 A1 | 1/2008 | Barnes et al. | |
| 2008/0044137 A1 | 2/2008 | Luther et al. | |

FOREIGN PATENT DOCUMENTS

| | | |
|---|---|---|
| WO | 94/24598 | 10/1994 |
| WO | 95/06891 | 2/1995 |
| WO | 00/72072 A1 | 11/2000 |
| WO | 2007/148032 A1 | 12/2007 |
| WO | 2008/029072 A1 | 3/2008 |

OTHER PUBLICATIONS

"OmniReach™ Multiport Service Terminal MST-2, MST-4, MST-6, MST-8 and MST-12 User Manual", ADC Company [online]; Doc. No. ADCP-96-040; Issue 2 (Mar. 31, 2006) [retrieved from the internet on Sep. 11, 2008], URL <http://www.adc.com>.

"OmniReach™ Multi-Fiber Service Terminal (MST) Adapter Replacement Instructions", ADC Company [online]; Doc. No. ADCP-96-089, Issue 1 (Sep. 30, 2006) [retrieved from the internet on Sep. 11, 2008], URL <http://www.adc.com>.

* cited by examiner

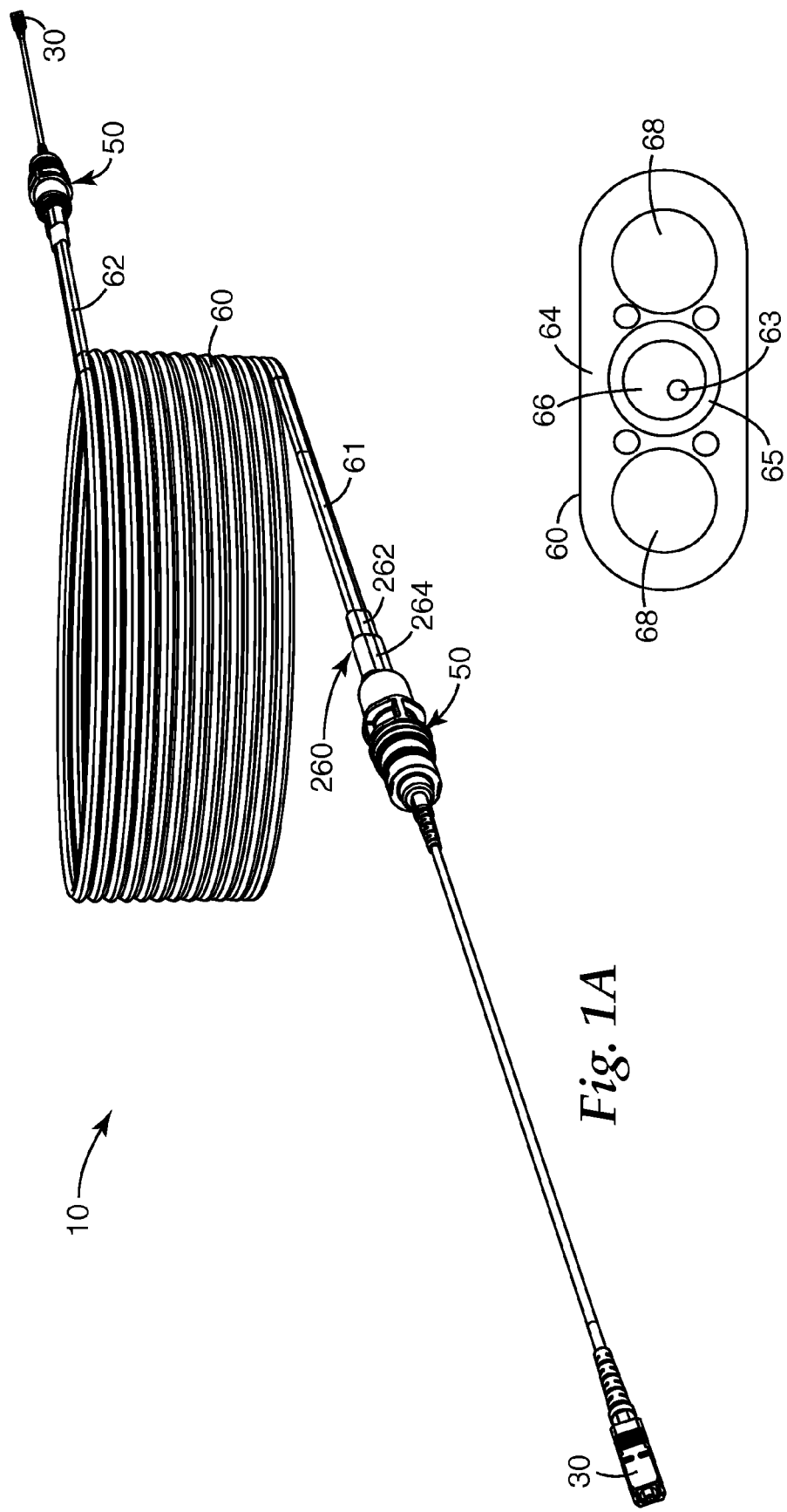

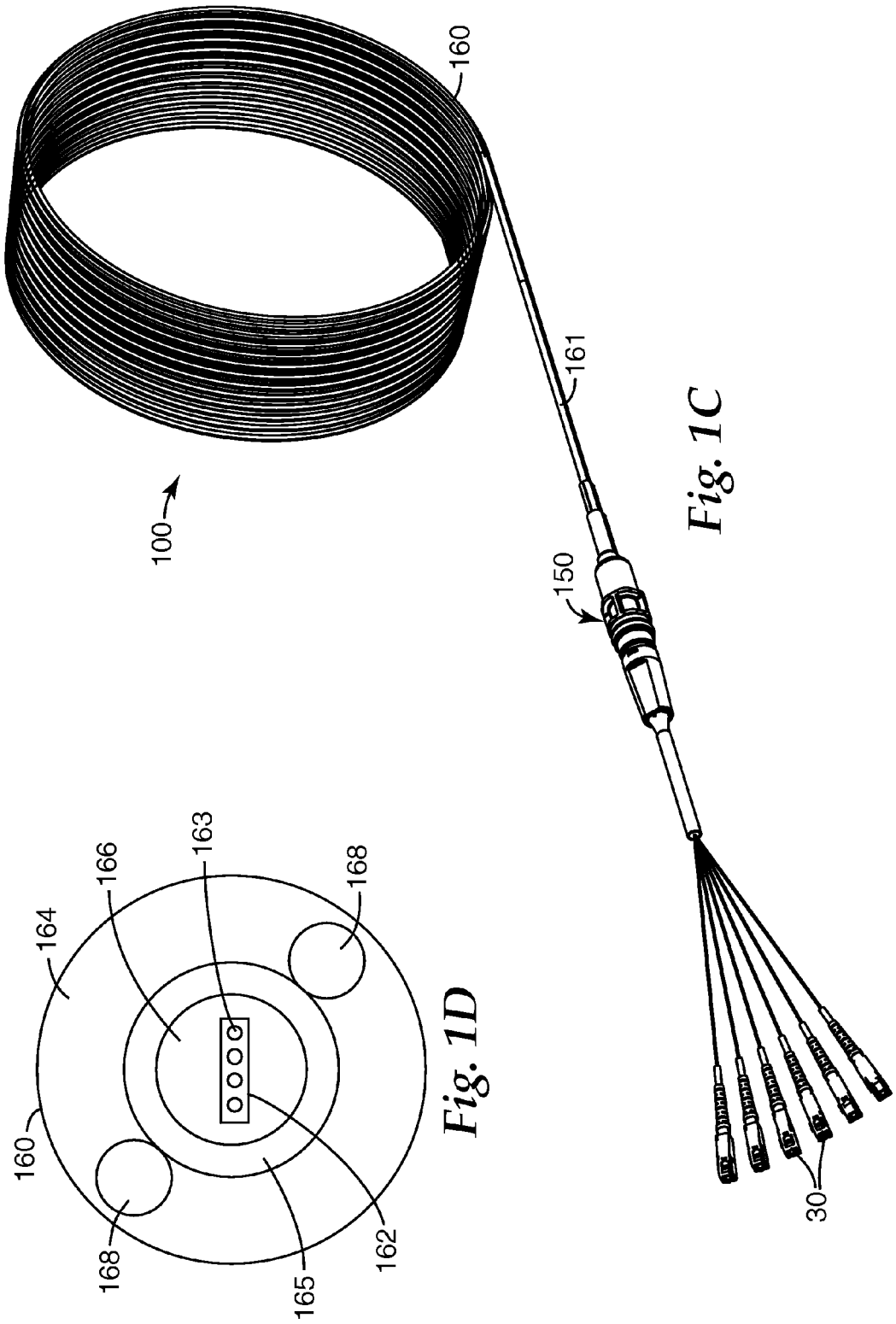

OPTICAL FIBER CABLE INLET DEVICE AND TELECOMMUNICATIONS ENCLOSURE SYSTEM

CROSS REFERENCE TO RELATED APPLICATIONS

This application is a national stage filing under 35 U.S.C. 371 of PCT/US2008/057010, filed Mar. 14, 2007, which claims the benefit of U.S. Provisional Patent Application No. 60/895,233, filed Mar. 16, 2007; U.S. Provisional Patent Application No. 60/895,247, filed Mar. 16, 2007; and U.S. Provisional Patent Application No. 60/946,311, filed Jun. 26, 2007, the disclosures of which are incorporated by reference herein in their entirety.

FIELD OF THE INVENTION

The present invention relates to an inlet device for inserting a cable containing optical fibers into a telecommunication's enclosure, e.g. into a terminal closure, pre-stubbed terminal, optical network terminal or other junction box.

BACKGROUND OF THE INVENTION

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. Additionally, as data transmissions increase, the fiber optic network is being extended closer to the end user which can be a premise, business, or a private residence.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunications enclosure to protect the exposed interior of the cable. The cable branches may be further distributed until the network reaches individual homes, businesses, offices, and so on. These networks are often referred to as fiber to the premise (FTTP) or fiber to the home (FTTH) networks.

In an FTTH network, optical fiber is brought to the end user and connected to the optical network terminal (ONT) unit mounted on a wall at the end user. The ONT converts this optical signal into conventional electrical signals to provide voice (telephone), Internet (data) and video signals to the end user.

Fiber terminals are one type of telecommunications enclosure that is typically located near an end user in a FTTP network to distribute the final service to the end user. Typical fiber terminals are designed to drop services (to provide service connections) to a small number of premises having typically between four to twelve end users. The last service connection from the fiber terminal is made to the ONT, located at the end user using a drop cable. Typically, an optical connector attached to the terminal end of an optical fiber of the cable is preferred to allow quick, reliable field installation.

There are two basic types of fiber terminals used in the FTTP networks: integrated terminal closure and pre-stubbed terminals. Pre-stubbed terminals include an installed multi-fiber cable which may vary in length from 50 ft to 5000 ft. One end of this cable is usually connected to a distribution cable in distribution splice closure. The other end of this multi-fiber cable, typically having between 4 to 12 optical fibers, is terminated with a conventional industry standard connector such as an SC APC connector. This cable assembly may be referred to as a multi-fiber fanout cable assembly. The pre-connectorized end of the multi-fiber cable may be provided separately or be pre-installed in the pre-stubbed terminal when supplied to the customer. A pre-terminated single fiber drop cable may have one or both ends pre-terminated with an optical connector.

A conventional watertight inlet device is described in U.S. Pat. No. 6,487,344 which can be inserted into a port in the wall of a telecommunications enclosure.

A special sealed, hardened optical connector or plug solution is being deployed currently in some drop cables used in FTTP networks. This system provides for the optical connection to be made proximate to the wall of a terminal closure which may cause service interruptions when subjected to harsh environmental conditions. This connector platform requires a specific mating receptacle be mounted in the wall of the closure. Finally, the design of the connector and receptacle make cleaning of the optical interface difficult, prior to the installation of service.

SUMMARY OF THE INVENTION

In a first embodiment of the invention, an inlet device has a housing with an internal strength member securing section configured to fasten at least one strength member within the housing and a fiber guide device. The fiber guide device may be designed to accommodate single fiber cables or multi-fiber cables. An exemplary fiber guide device comprises a multifiber fanout device. A strain relief member may be fitted to the inlet device to control the bend radius and relieve strain to the cable on a first side of the device. In one aspect, the housing can be a unibody structure that includes the strength member securing section, a orientation control section formed on an outer surface of the unibody structure, an annular channel to receive a sealing member formed in the outer surface of the unibody structure, a lock engagement feature formed in the outer surface of the unibody structure, and a fiber guide receptacle formed in the second end of the unibody structure.

In another embodiment, at least one inlet device may be mounted on a predetermined length of optical fiber cable to form an optical fiber cable assembly. The inlet device includes a housing with an internal strength member securing section configured to fasten at least one strength member within the housing and a fiber guide device. Optionally, an optical connector may be mounted to at least one optical fiber exiting the second end of the inlet device. A pulling sock may be fitted over the end of the cable to facilitate installation of the cable into the fiber network. The optical fiber cable assembly may include one of a multi-fiber ribbon cable, single fiber cable and multi-fiber loose buffer tube cable.

Yet another aspect of the present invention provides a method of preparing a cable assembly. An optical fiber cable is prepared to expose at least one optical fiber and at least one strength member of the cable. The cable is inserted into a first end of a housing that includes an internal strength member securing section. The at least one strength member is secured within the securing section. At least one optical fiber is inserted into an optical fiber guide device and the fiber guide device is mounted onto a second end of the housing.

Another embodiment provides a kit of parts for the field assembly of a cable assembly. The kit of parts includes a housing having an internal strength member securing section, at least one fiber guide device, a fiber retainer, a fiber guide cover and strain relief members for both the entering cable and exiting fiber. The kit can additionally include an alignment insert, at least one protective tube, at least one optical connector and/or a pulling sock shaped to receive the cable-mounted housing.

In another exemplary embodiment, a fanout device organizes a plurality of optical fibers from an optical fiber cable. The fanout device includes a base and a guide support having a front side and a back side extending from the base. The guide support has a plurality of fiber guiding channels wherein a first set of the fiber guiding channels is disposed on the front side of the guide support. Each of the first set of fiber guiding channels includes a funnel shaped entrance channel portion and an open channel portion. The fanout device may further include a shelf disposed between the guide support and the base. The shelf may include a plurality of second funnel shaped entrance channel portions, each aligned with a corresponding second open channel portion on the backside of the guide support.

In another aspect of the invention, a telecommunications enclosure system includes cable assembly having an inlet device that is received in an opening of the telecommunications enclosure. The inlet device includes a housing with an internal strength member securing section configured to fasten at least one strength member within the housing, and a fiber guide device. An optional port adapter may be disposed in the opening to allow the insertion of the inlet device. The optical fiber cable assembly may include one of a multi-fiber ribbon cable, single fiber cable and multi-fiber loose buffer tube cable.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 1A shows a drop cable assembly according to an embodiment of the present invention.

FIG. 1B shows one exemplary drop cable configuration having a loose buffer tube.

FIG. 1C shows a multi-fiber fanout cable assembly according to an embodiment of the present invention.

FIG. 1D shows one exemplary drop cable configuration having a central tube fiber ribbon cable.

Figure 2:
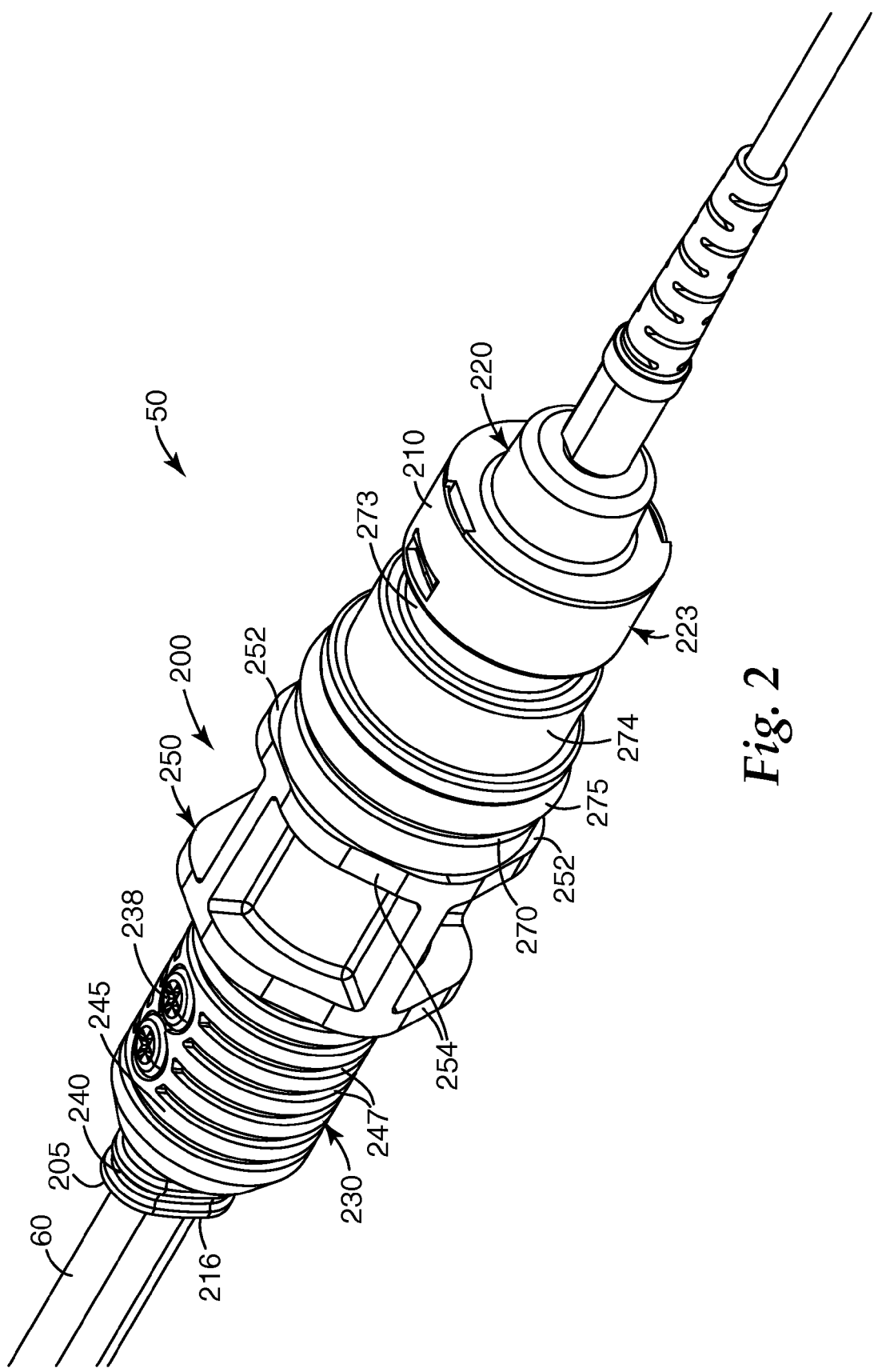
FIG. 2 shows an isometric view of an inlet device according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Exemplary embodiments herein provide an inlet device for the insertion of an optical fiber cable into a telecommunications enclosure. Particular advantages of the design of the present inlet device include a robust housing and the ability to accommodate either single fiber cables or multi-fiber cables by changing a minimal number of parts (e.g. the fiber guide device). The exemplary inlet device is designed to provide an environmental seal when installed in a telecommunications enclosure. By providing an environmental seal, the inlet device can be designed to provide a watertight or water resistant seal and/or to prevent dust, bugs or any other foreign substance from entering the enclosure. The housing described herein is also referred to as a "unibody housing", as it provides a single structure that incorporates and/or accommodates a strength member securing section, an orientation control section, a sealing member, a locking mechanism and a fiber guide attachment section.

In a first embodiment of the present invention, an exemplary inlet device is part of a pre-terminated drop cable. FIG. 1A shows a drop cable assembly 10 having two inlet devices 50 and two optical connectors 30 mounted on the first and second ends 61, 62 of the drop cable 60. While FIG. 1A shows a pre-terminated drop cable having two exemplary inlet devices, an alternative embodiment of a pre-terminated drop cable may have a single exemplary inlet device. Connection to the second end of the drop cable may be made using a mechanical splice, a fusion splice or a field mounted connector. Alternatively, the exemplary inlet device can be mounted on a single fiber distribution cable to for a single fiber cable assembly.

FIG. 1B shows a cross-sectional view of an exemplary all purpose optical fiber drop cable available from Sumitomo Electric Lightwave (Research Triangle Park, N.C.). The drop cable 60 has a semi-rigid outer sheath 64 surrounding a loose buffer tube 65 and a pair of strength members 68 located on either side of the buffer tube. One to twelve optical fibers 63 may reside in the buffer tube surrounded by a water-blocking gel or grease 66. Similar cables include ResiLink ADF™ All-Dielectric Flat Drop Cable available from Pirelli Cables and System (Columbia, N.C.), and Mini DP Flat Drop Cable available from OFS (Northcross, Ga.). The optical fiber has a polymeric coating that surrounds and protects the glass fiber. The strength members may be either semi-rigid rods or a collection of loose fibers e.g. made of aramid fibers.

Figure 9:
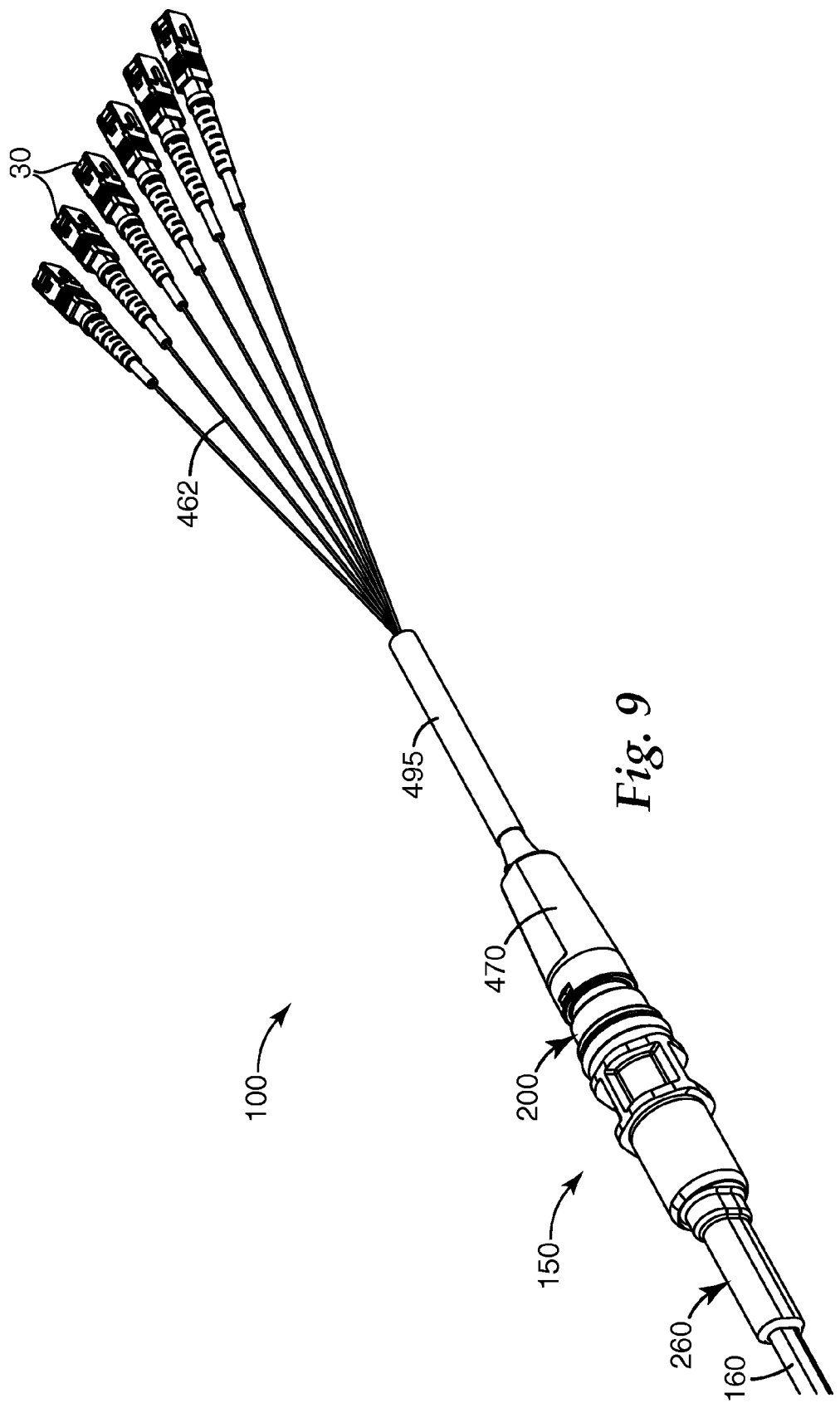
FIG. 9 shows an isometric view of a multi-fiber cable fanout assembly according to an embodiment of the present invention.

In another embodiment of the present invention, an exemplary inlet device is part of a pre-terminated multi-fiber cable. FIGS. 1C and 9 show a multi-fiber cable fanout assembly 100 having an inlet device 150 and a plurality of optical connectors 30 mounted on a first end 161 of the multi-fiber cable 160. Connection to the second end (not shown) of the multi-fiber cable 160 may be made using a plurality of single mechanical splices or a plurality of fusion splices, a multi-fiber mechanical splice, a multi-fiber fusion splice, or a plurality of field mounted connectors.

FIG. 1D illustrates another exemplary all purpose multi-fiber cable 160 available from Pirelli Cables and System. The cable has a semi-rigid outer sheath 164 surrounding a loose buffer tube 165 and a pair of strength members 168 located on either side of the buffer tube. Four to twelve optical fibers 163 reside in the form of a fiber ribbon 162 in the buffer tube surrounded by a water-blocking gel or grease 166. Alternatively, the fiber ribbon may reside directly in the sheath without a loose buffer tube.

Each optical fiber will have a polymeric coating that surrounds and protects the central glass fiber. The strength members are generally in the form of at least one semi-rigid rod of compacted aramid fibers. If more than one of these semi-rigid strength members is present in the multi-fiber cable they may be positioned around the optical fiber ribbon cable or the protective tubes. Alternatively the multi-fiber cable may have a combination of a semi-rigid central strength member and a plurality of loose or woven flexible strength members surrounding the optical fiber ribbon cable or the protective tubes.

For example, optical connectors 30 may be mounted on the end of the drop cable or multi-fiber cable. Connectors 30 may be connectors such as a SC, DC, SC-DC, ST, FC, or LC connectors, to name a few, and may be, for example, either a positive contact (PC) or an angled polished connector (APC) type of connector. Sample connectors include 3M™ No Polish Connector SC Plug, 3M™ Hot Melt LC Connector, and 3M™ CRIMPLOK™ ST SM 126 UM Connector, each of which is available from 3M Company (St. Paul, Minn.). In some embodiments of the present invention, no connectors may be put on the end of the optical fiber, instead the free ends of the optical fiber may be spliced into the network using either fusion splices or mechanical splices such as 3M™ Fibrlok™ II mechanical splices available from 3M company (St. Paul, Minn.). Alternatively, a field mountable connector such as SC, DC, SC-DC, ST, FC, or LC connectors, to name a few, or 3M™ SC No Polish Connector available from 3M Company (St. Paul, Minn.).

FIGS. 2-4 and 5A and 5B show an exemplary inlet device 50. The inlet device includes a housing 200, referred to herein as a unibody housing, having a first end 205 and a second end 210 and a fiber guide device 220 attachable to the unibody housing at the second end. The unibody housing is generally cylindrical in shape and includes an interior passageway 215 that extends along the length of the unibody housing from the first end to the second end of the housing. The housing has a passage entry 216 that may be configured to accommodate certain categories of drop and multi-fiber cables (i.e. round cables, flat cables, etc.).

In addition, the unibody housing 200 has an internal strength member securing section 230 formed in an interior portion of the housing. The strength member securing section can be configured to fasten at least one strength member 68 to the unibody housing. The strength member securing section includes an opening or passageway 231 for the optical fibers to pass through and at least one opening 232 for passage of at least one strength member into at least one securing well or chamber 235 (see FIGS. 5A and 5B). When a strength member 68 is inserted into a securing well 235, it can be locked in place by at least one mechanical fastener or pin 238 which passes through a hole 237 in a wall of the securing well such that the strength member 68 is trapped between the end of the mechanical fastener and the opposing wall of the securing well. The mechanical fasteners or pins 238 may be optionally inset in recesses 239 in the outer wall 201 of the unibody housing.

Other features of the unibody housing 200 include a primary and secondary cable strain relief attachment surface (240, 245), an orientation control section 250, an annular channel 270 to hold a sealing member 275, a lock engagement feature 273 and a fiber guide device attachment section 223.

The primary cable strain relief attachment surface 240 is located between the passage entry 216 and the secondary cable strain relief attachment surface 245. The secondary cable strain relief attachment surface 245 is located between the primary cable strain relief attachment surface 240 and the orientation control section 250. The outside circumference of the primary cable strain relief attachment surface is smaller than the circumference of the secondary cable strain relief attachment surface so that a two-part cable sealing and strain relief member 260 (see FIG. 9) can be attached to the unibody housing without substantially increasing the overall diameter of the unibody housing. The two-part cable sealing and strain relief member secures and seals the drop cable to the unibody housing 200. This cable strain relief member also provides a strain relief to the drop cable by maintaining the proper bend radius of the cable when it is installed in a telecommunications enclosure. Also, the cable strain relief member provides retention of the cable against pull-out forces.

In one embodiment, the primary and secondary cable strain relief attachment surfaces (240, 245) may have a smooth surface texture. In another embodiment, the primary and secondary cable strain relief attachment surfaces may have a ribbed, undulating or other rough surface texture. FIGS. 2-4 and 5A and 5B show an embodiment of the primary and secondary cable strain relief attachment surfaces having ribs 247. It may be advantageous to have a rough ribbed, undulating or other rough surface texture on the primary and secondary cable strain relief attachment surfaces to improve mechanical strength of the connection of the unibody housing to the cable sealing and strain relief member 260.

The two-part cable sealing and strain relief member 260 is made up of two layers, a primary layer 262 and a secondary layer 264 as shown in FIG. 1A, which surrounds a portion of the cable jacket. The primary layer 262 of the cable sealing and strain relief member attaches to the primary cable strain relief attachment surface 240 and extends for some distance from the end of the unibody housing (e.g. about 3 in (7.6 cm) to about 6 in (15.2 cm)). The secondary layer 264 of the cable sealing and strain relief member attaches to the secondary cable strain relief attachment surface 245 and extends over the primary layer 262 of the cable sealing and strain relief member 260 for some length beyond the end of the unibody housing 200. The layers 262, 264 of the cable sealing and strain relief member 260 may include molded preformed strain relief boots, a recoverable sleeve, or adhesive coated heat shrink tubing such as ATUM and TAT Heat shrink tubing available from Tyco Electronics Corporation (Harrisburg, Pa.) and HDT tubing available from 3M Company (St. Paul, Minn.).

The orientation control section 250 may be utilized when the inlet device 50 is inserted into a complementary port structure in a telecommunications enclosure in a known or controlled orientation. In FIG. 2, the orientation control section is positioned on the unibody housing 200 between the secondary cable strain relief attachment surface 245 and the annular channel 270 which is configured to hold the sealing member 275. The external dimensions of the orientation control section may be somewhat larger than the remainder of the unibody housing. In some embodiments of the current invention, the orientation control section determines the ultimate cross-sectional diameter of the inlet device. Portions of the orientation control section may form abutment surfaces 252 which extend from the generally cylindrical surface of the unibody housing. These abutment surfaces can cooperate with a shoulder in the port of a telecommunications enclosure to properly seat the inlet device in a telecommunications enclosure.

The orientation control section 250 may have an external shape comprising a polygonal shape including a plurality of facets 254, while the rear portion of the enclosure port has a corresponding female shape. Alternatively, the orientation control section may have any external polygonal shape on the outer surface of the unibody housing comprising at least one flat facet and at least one arcuate section such that the unibody housing has a truncated circular cross-section or a D-shaped cross-section. The external shape of the orientation control section engages with least a portion of a corresponding female shape port in a telecommunications enclosure.

The sealing member 275 is positioned in an annular channel 270 in the unibody housing. The channel is preferably situated proximate to the orientation control section. In one embodiment the sealing member 275 is a rubber o-ring.

The lock engagement feature 273 can be in the form of a groove or trench and can be located between annular channel 270 and the fiber guide device attachment section 223. The lock engagement feature is separated from the annular channel 270 by a neck 274. The neck provides for sufficient space between the lock engagement feature and channel 270 so that when the device is fully seated within the port, the lock engagement feature is inside of the telecommunications enclosure. A keying mechanism such as a forked locking key 276 (FIGS. 15 and 22) may be inserted into the locking feature to securely fasten the device in the port of the telecommunications closure. The exemplary forked locking feature has a handle 277 and two tines (278, 279) which extend from the handle. The two tines fit into the locking engagement feature 273 on either side of the unibody housing 200 to prevent the device from slipping in the port.

Figure 4:
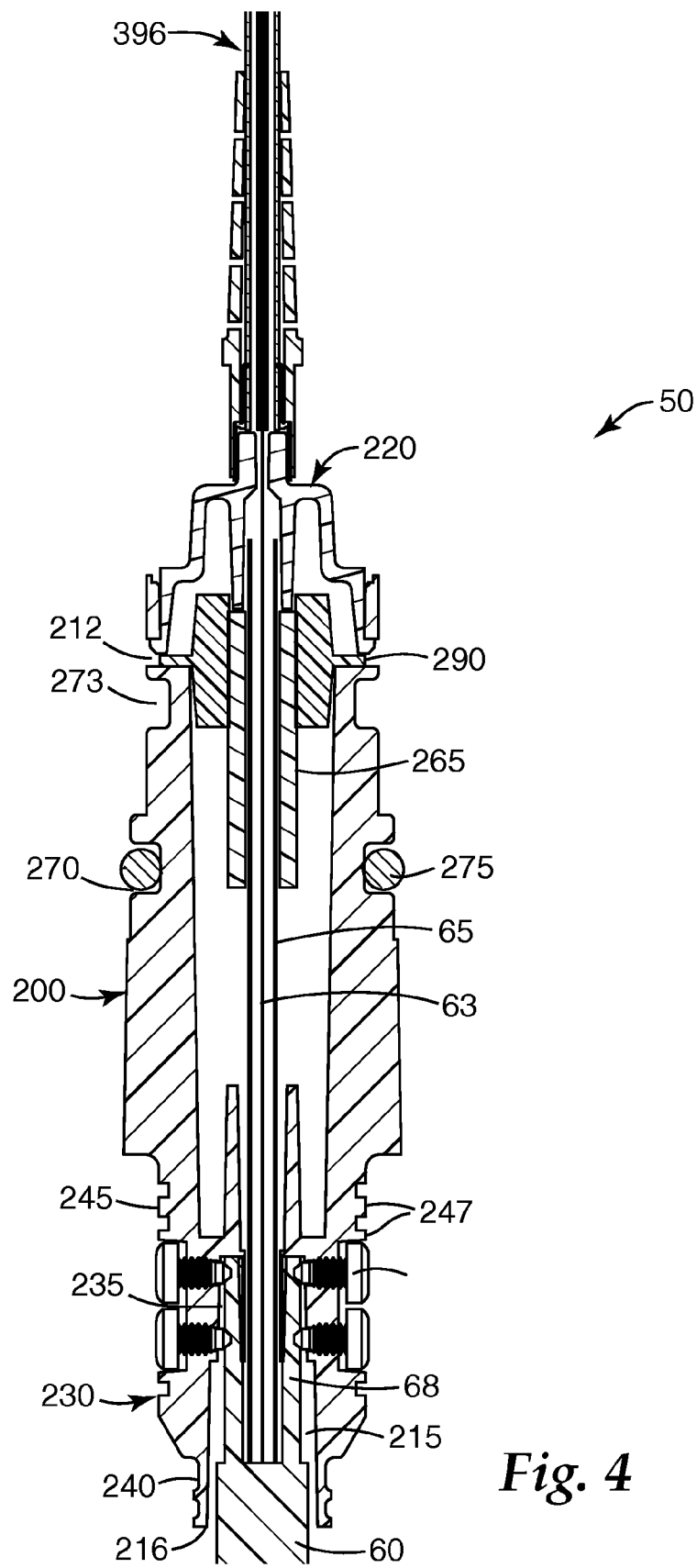
FIG. 4 shows a cross-sectional view of an inlet device according to an embodiment of the present invention.
Figure 5A:
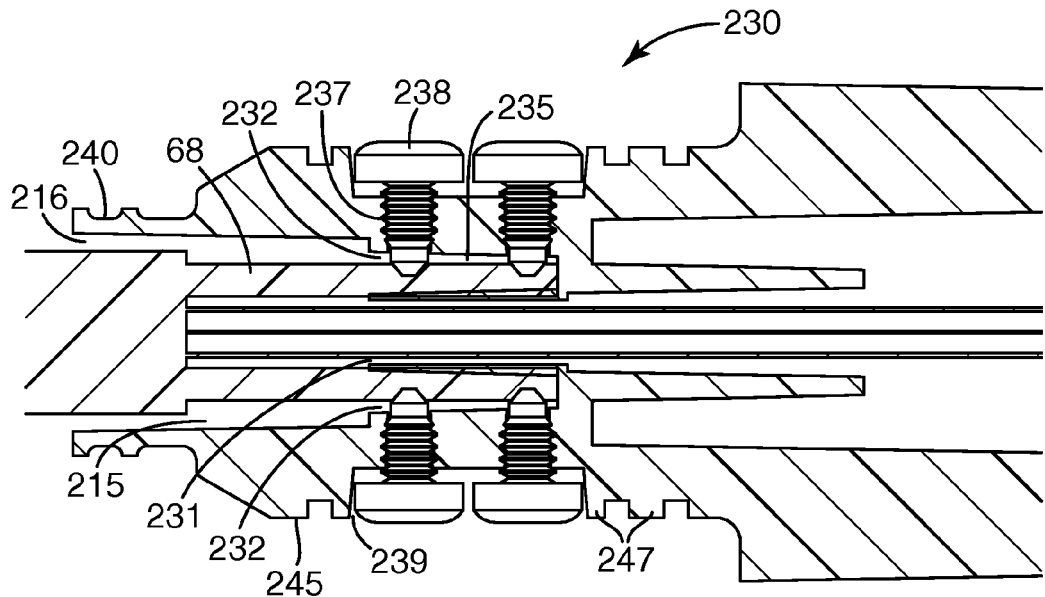
FIG. 5A shows a detailed cross-sectional view of the strength member securing section of an inlet device according to an embodiment of the present invention.
Figure 5B:
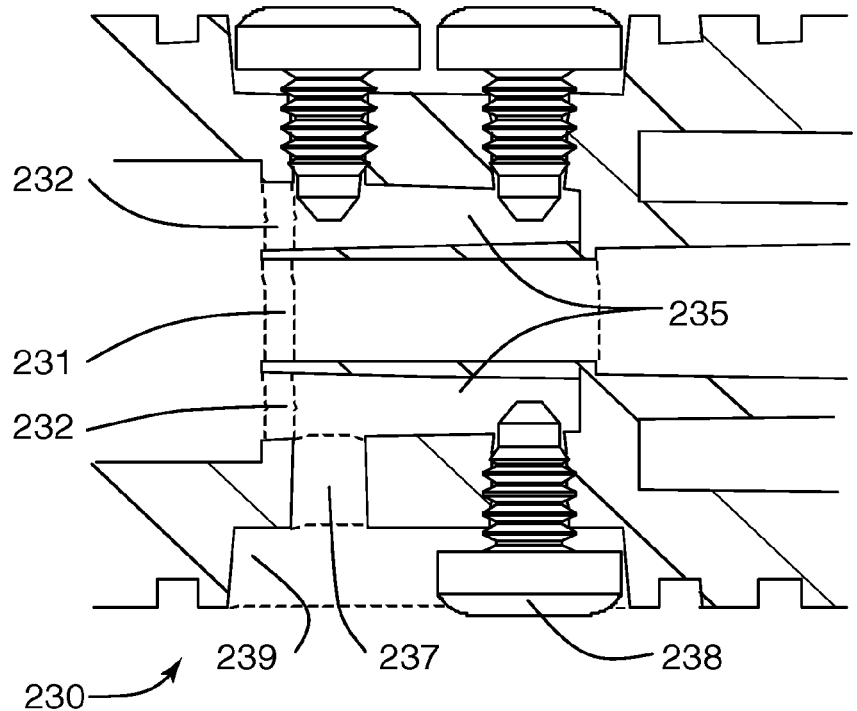
FIG. 5B shows a close-up cross-sectional view of the strength member securing section of an inlet device according to an embodiment of the present invention.

FIGS. 2 and 4 show the attachment of a fiber guide device to the unibody housing at the second end. The fiber guide device has at least one fiber guide for guiding at least one optical fiber.

One advantageous aspect of the disclosed inlet device 50, 150 is that the optical fiber passes freely through the device without significant pressures or forces acting on the optical fiber. The cable and strength members are securely attached to the first end of the unibody housing.

Figure 7:
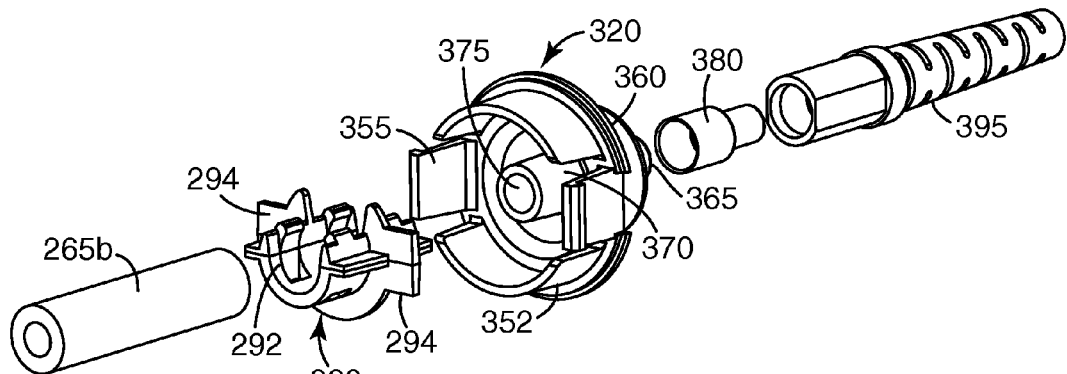
FIG. 7 shows an exploded view of the fiber guide device of an inlet device according to an embodiment of the present invention.
Figure 10:
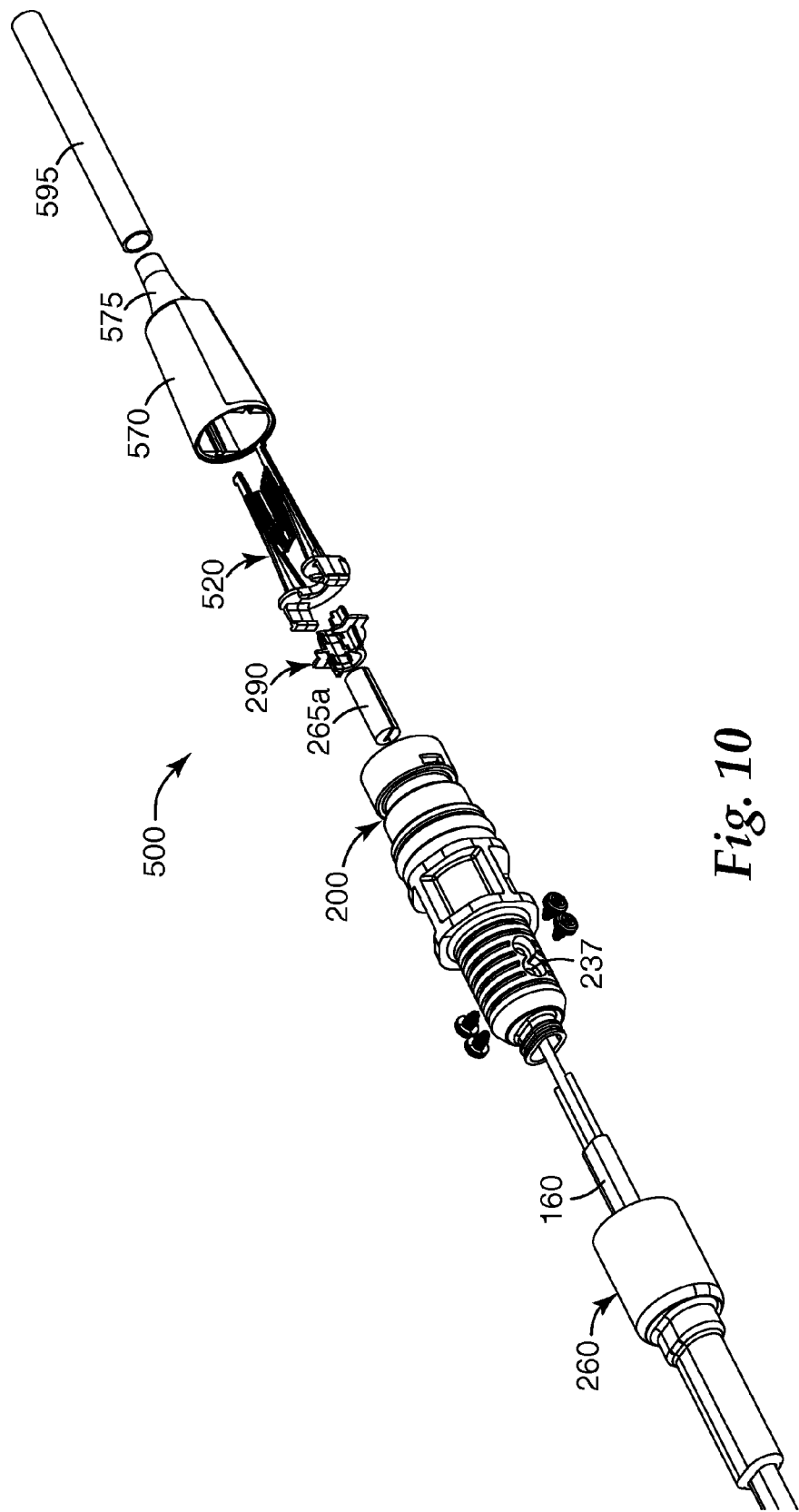
FIG. 10 shows an exploded view of a multi-fiber cable fanout assembly according to an embodiment of the present invention.
Figure 11:
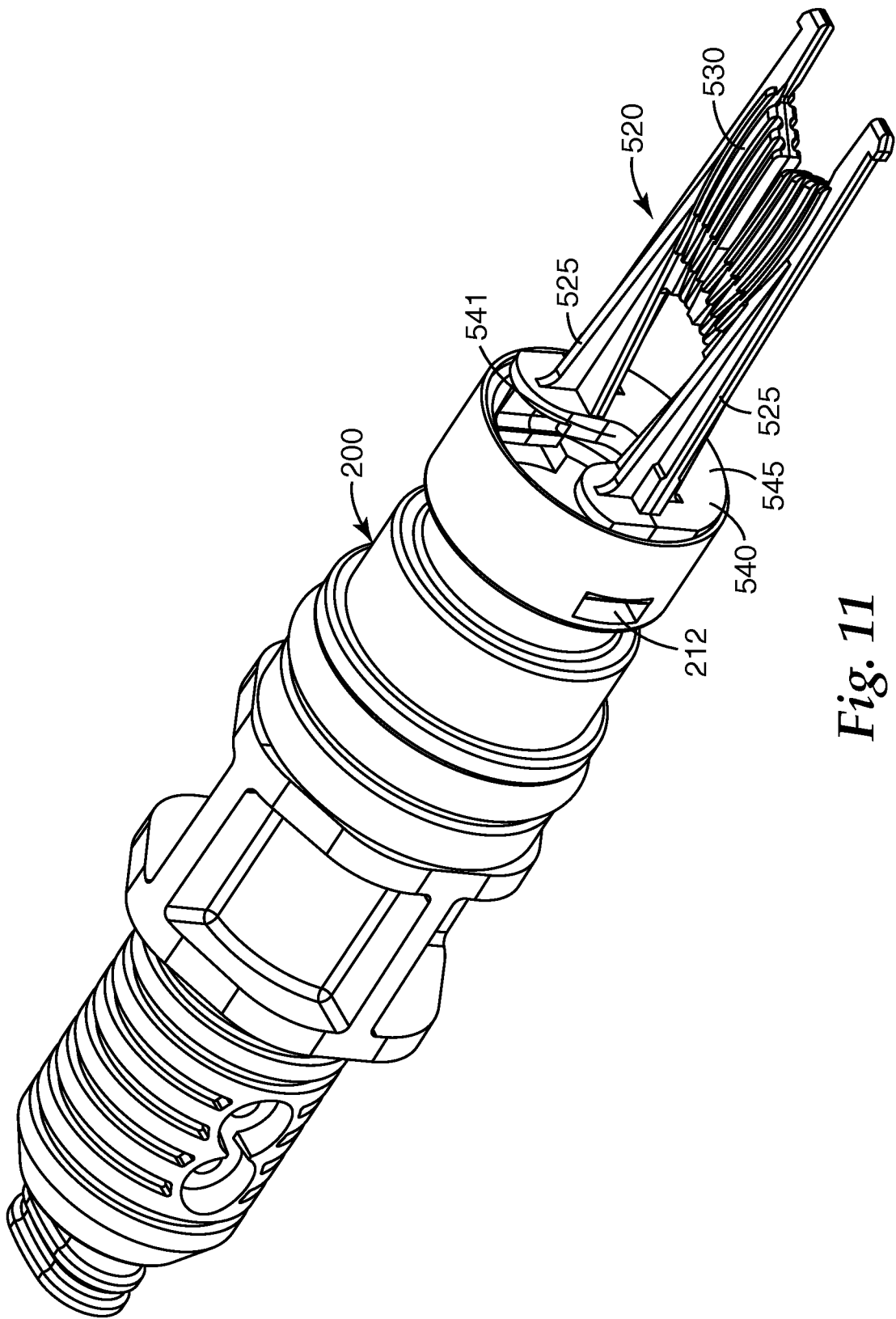
FIG. 11 shows an isometric view of a portion of a multi-fiber cable fanout assembly according to an embodiment of the present invention.
Figure 12:
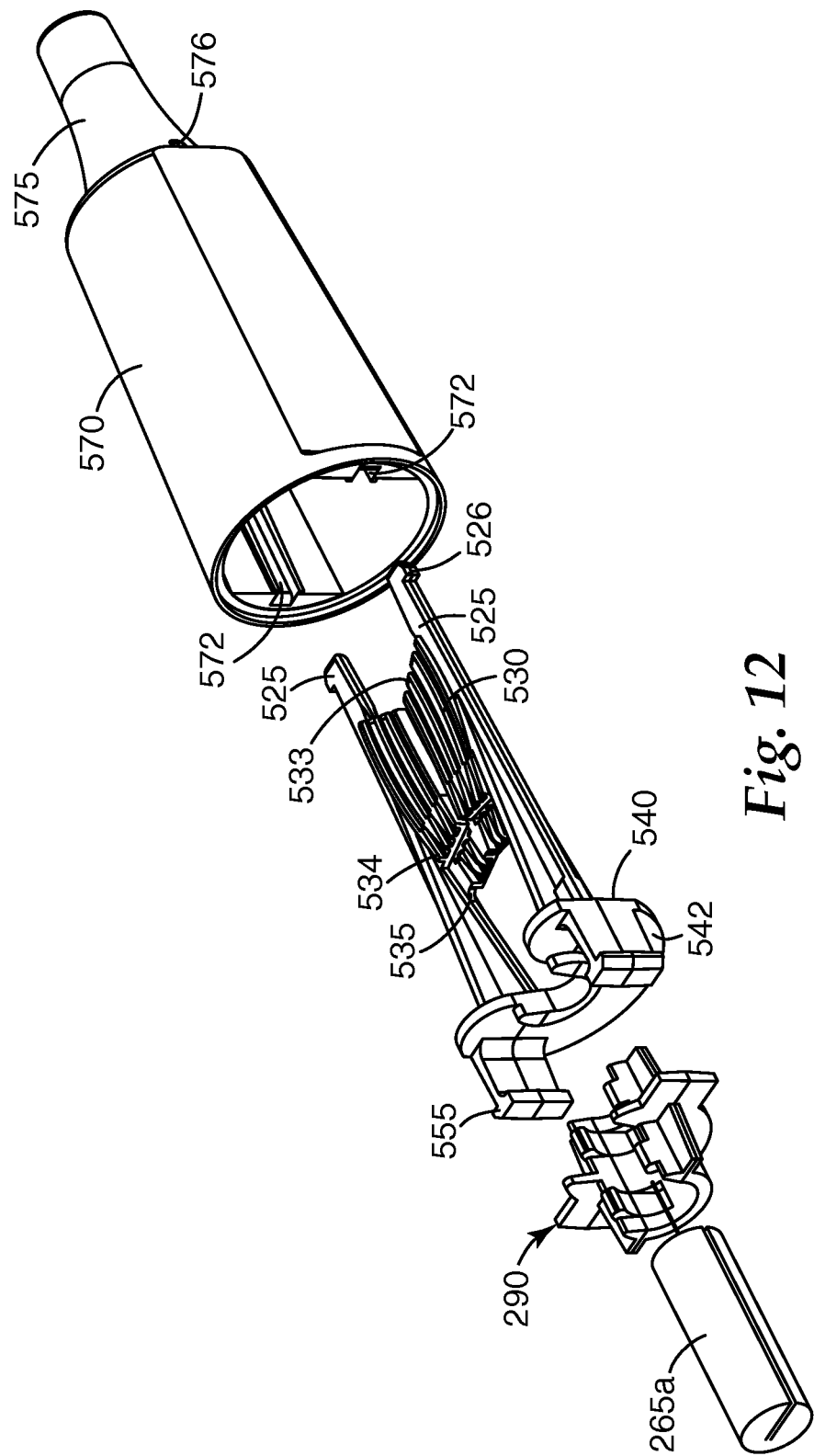
FIG. 12 shows a detailed exploded view of a multi-fiber cable fanout device according to an embodiment of the present invention.

A retainer device 290 is used to keep the optical fibers in the center of the passage 215 at the second end 210 of the unibody housing 200. This fiber retainer 290 may be optional depending on the length of the unibody housing. The fiber retainer has a c-shaped receiving area 292 having two wings 294 (see FIG. 7) extending from the top and bottom portions of the "c". The wings cooperate with slots 266 (FIG. 3) in the second end 210 of the unibody housing 200 to prevent the loose tube or fiber ribbon cable from rotating, bending or kinking in the housing. An alignment insert 265 can be inserted into the c-shaped receiving area 292 of the fiber retainer 290. In one exemplary embodiment, the alignment insert comprises a cylindrical foam alignment insert 265a having a slit extending the length of the insert and approximately 60% through the width of the cylinder (see FIGS. 10 and 12). An optical fiber ribbon may be placed into the slit and the insert may be fitted into the fiber retainer 290. Alternatively, a short section of tubing 265b (FIG. 7) such as Tygon tubing can be used as the alignment insert to guide one or more loose buffer tubes containing one or more optical fibers or one or more fiber ribbons.

The inlet device 50, 150 may be formed of any suitable plastic material. In one embodiment, the unibody housing, fiber retainer, fiber guide plates, cover and locking key are formed of polymeric materials by methods such as injection molding, extrusion, casting, machining, and the like. For example, these parts may be made of molded polypropylene, nylon, polypropylene/nylon alloys or glass filled versions of these polymers. Material selection will depend upon factors including, but not limited to, chemical exposure conditions, environmental exposure conditions including temperature and humidity conditions, UV exposure conditions, flame-retardancy requirements, material strength, and rigidity, to name a few.

Single Fiber Orifice Plate

Figure 3:
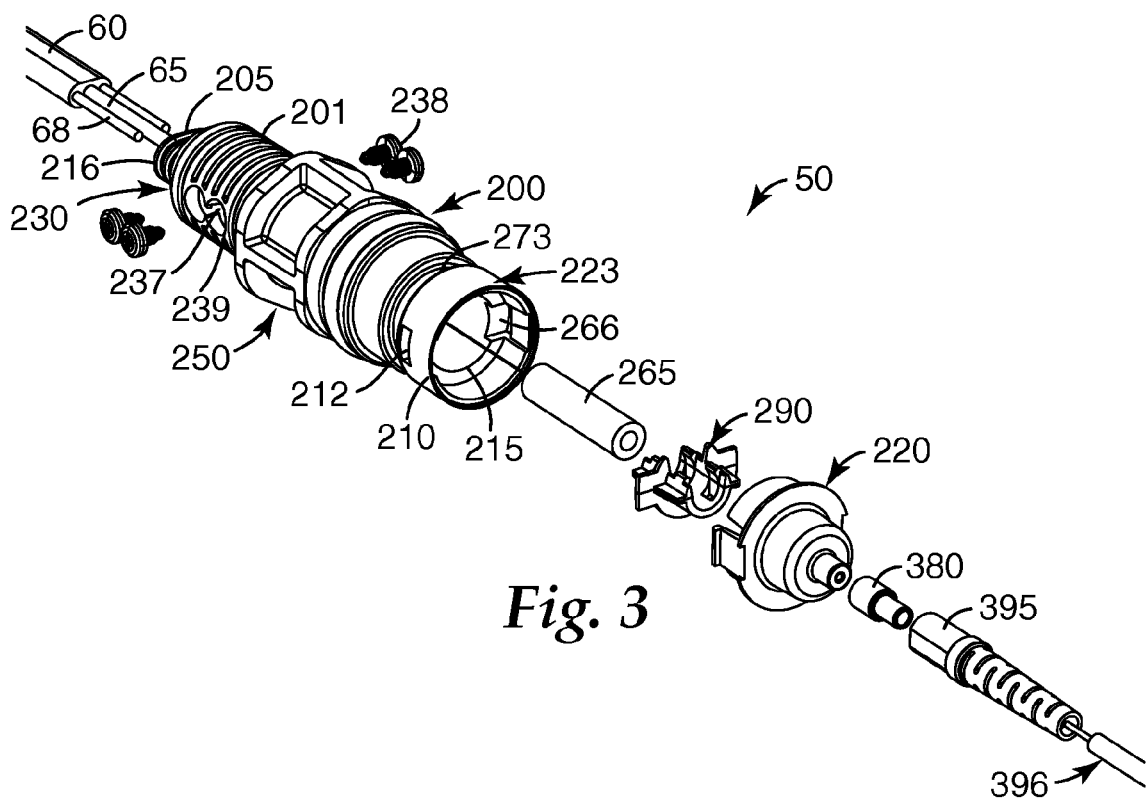
FIG. 3 shows an exploded view of an inlet device according to an embodiment of the present invention.

In a first embodiment of an exemplary fiber guide device 220 shown in FIGS. 2-4, the fiber guide device comprises a single fiber orifice plate. An exemplary single fiber orifice plate 320 is described in more detail with reference to FIGS. 6 and 7. The orifice plate comprises a disc shaped base 340 having a hole 341 extending through the center of the base from a first side 342 to a second side 345 of the base. A pair of flanges 352 is mounted on and extends away from the first side 342 of the base 340. The flanges may be set back from the edge of the first side 342 of base 340. For example, when the orifice plate is inserted into the second end 210 of the unibody housing 200, the flanges 352 can slip into the housing passageway 215. The orifice plate 320 may also have at least one latch 355 extending from the first side 342 of the base 340 to engage with a slot 212 in the second end 210 of the unibody housing 200 to secure orifice plate 320 to the unibody housing. Alternatively, the orifice plate may be adhesively bonded in place in the second end of the unibody housing.

The orifice plate 320 can further include a cap 360 mounted on the second side 345 of the base 340. A fiber guide 365 may extend from the topside of cap 360, and a boss 370 may extend from the bottom side of the cap. The boss 370 includes a passage 375 through its center that aligns with the hole 366 through fiber guide 365.

In one example, the fiber guide may extend a sufficient distance from the top of cap 360 to allow for the application of a crimp ring 380. The crimp ring can secure a section of protective tubing such as jacketed fanout tubing 396 to the single fiber orifice plate. An optional rubber fiber strain relief member or boot 395 may be placed over the crimp ring 380 to control the minimum bend radius of an optical fiber passing through the orifice plate.

Multi-Fiber Orifice Plate

In another aspect, FIG. 9 shows a multi-fiber cable fanout assembly 100 mounted on a multi-fiber cable 160. The fanout assembly has an inlet device 150 having a unibody housing 200, such as that described above, a multi-fiber guide device (not shown), and optional cover 470 having a fiber strain relief member or boot 495 attached thereto and a cable sealing and strain relief member 260. Each of the optical fibers of the multi-fiber cable may be contained in a protective tube 462 and terminated with an optical fiber connector 30.

Figure 8:
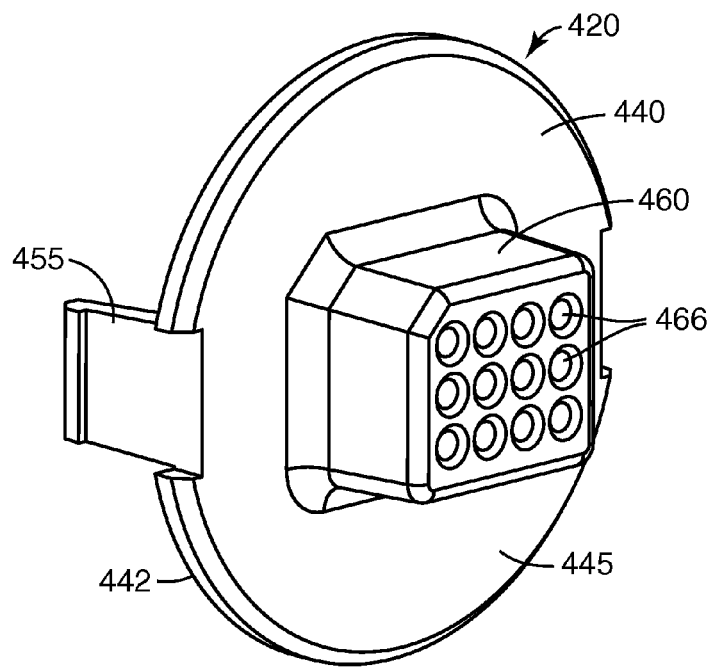
FIG. 8 shows an isometric view of one exemplary embodiment of a multi-fiber orifice plate.

In another embodiment of an exemplary fiber guide device as shown in FIG. 8, the fiber guide device can comprise a multi-fiber fiber orifice plate 420. The orifice plate 420 includes a disc shaped base 440 having a first side 442 and a second side 445. A pair of flanges (not shown) may be mounted on and extend away from the first side 442 of the base 440. The flanges may be set back from the edge of the first side 442 of the base 440 such that when the orifice plate is inserted into the second end 210 of the unibody housing 200, the flanges slip into the housing passageway 215. The orifice plate may also have at least one latch 455 extending from the first side of the orifice plate to engage with a slot 212 in the second end 210 of the unibody housing 200 to secure the orifice plate 420 to the unibody housing. Alternatively, the orifice plate may be adhesively bonded in place in the second end of the unibody housing.

The orifice plate 420 can include a cap 460 mounted on the second side 445 of the base 440. Cap 460 includes a plurality of fiber passages 466 extending through the base 440 to allow for multiple separate fibers to pass from the front side 442 to the second side 445 of the base. Each fiber passage 466 may have a conical entry (not shown) on the first side 442 of the base 440 to facilitate feeding the fibers through the orifice plate.

An optional cover 470 (FIG. 9) with a funnel-shaped fiber exit port may be slipped over the multi-fiber orifice plate 420 and an optional fiber strain relief boot 495 may be slipped over the funnel shaped portion of the exit port to provide strain relief to multiple fibers.

Multi-Fiber Fanout Device

An alternative fiber guide device for a multi-fiber cable is a multi-fiber fanout device or multi-fiber organizer 520 shown in FIGS. 10-12 and 13A-13C. The multi-fiber fanout device has a disc shaped base 540 having a first side 542 and a second side 545. The disc may have a central orifice (not shown) or a substantially U-shaped cutout 541 to allow passage of optical fibers or an optical fiber ribbon through base 540. A pair of flanges (not shown) may be mounted on and extend away from the first side 542 of the base 540. The flanges may be set back from the edge of the first side 542 of the base 540 such that when the fanout device is inserted into the second end 210 of the unibody housing 200, the flanges slip into the housing passage 215. The base may also have at least one latch 555 extending from the first side of the base to engage with a slot 212 in the second end 210 of the unibody housing 200 to secure the fanout device 520 to the housing. Alternatively, the fanout device may be adhesively bonded in place in the second end of the unibody housing.

The fanout device 520 can include two legs 525 mounted on opposite sides of the second side 545 of the base 540. A guide support 530 is positioned above the second side of the base and between legs 525. The guide support has a front side 531, a back side 532, a top end 533 and a bottom end 534.

The guide support includes a plurality of fiber guiding channels wherein a first set of fiber guiding channels is disposed on the front side of the guide support. Each first fiber guide channel of the first set includes a first funnel shaped entrance channel portion and a first open channel portion on the support. The first funnel shaped entrance channel portion can be located at the bottom end 534 of guide support 530. The narrow end of each first funnel shaped entrance channel portion 535 opens into a corresponding first open channel portion 550 that extends from the narrow end of the funnel shaped entrance channel portion to the top end 533 of the guide support. The width of the first open channel portion is larger than the width of the narrow end of the first funnel shaped entrance channel portion. The first open channel portion 550 is configured to snugly hold a first protective tube 580 therein The narrow opening of the funnel shaped entrance channel portion 535 is arranged so that it aligns with the entrance to the central bore 582 of a protective tube which has been seated in open channel portion 550 (FIG. 13C). This configuration allows the fiber to be inserted into a first protective tube without having to manually align the fiber to the central bore 582 of the tube 580 wherein the first protective tube 580 is centered on a first funnel shaped entrance channel portion 535.

A plurality of second open channel portions 552 can be located on back side 532 of the support guide 530 such that they extend from the bottom end 534 to the top end 533 of the support guide.

A shelf 560 is positioned between legs 525 above the base 540. Also, shelf 560 may be positioned below and offset from the guide support 530. The shelf has a front side 561 and a back side 562. A plurality of second funnel shaped entrance channel portions 565 are located on the front side 561 of shelf 560. The narrow end of each second funnel shaped entrance channel portion 552 on the shelf 560 opens into a corresponding second open channel portion 552 located on the back side 532 of the guide support 532. The width of the second open channel portion 552 is larger than the width of the narrow end of the second funnel shaped entrance channel portion 565. The second open channel portion 552 is configured to snugly hold a second protective tube 582 therein. The second funnel shaped entrance channel portions 562 align with the entrance of the central bore 586 of a protective tube 585 which has been seated in second open channel portion 552 wherein the protective tube 585 is centered on a second funnel shaped entrance channel 535.

Alternatively, the fanout device can include a second set of guiding channels on the backside of the guide support. Each of the guiding channels of this second set would have a second funnel shaped entrance channel portion and a second open channel portion on the back side of the guide support. In this configuration, the shelf, as described above, would be omitted.

Optionally, support guide 530 may have a slot 545 extending from the top end 533 of support guide 530 a portion of the way to the bottom end 534 of the support guide. This slot allows the top of the legs 525 to flex.

A cover 570 having a funnel shaped outlet 575 may be slid over the multi-fiber fanout device 520 to protect the device. The legs 525 of the fanout device may be inserted in slot 572 in the cover 570. The cover slides axially down the legs 525 until the detents 526 on the ends of the legs engage with niches or slots 576 at the base of the funnel shaped outlet 575. An optional fiber strain relief member or boot 595 may be attached to the narrow end of the outlet.

Telecommunications Enclosure Having an Inlet Device

At each point where a telecommunication cable is opened, a telecommunications enclosure is provided to protect the exposed interior of the cable. Fiber terminals are one type of telecommunications enclosure used in FTTP networks to distribute the final service to the end user. Fiber terminals are designed to provide service connections to a small number of homes or businesses having typically between four to twelve end users.

Two basic types of fiber terminals are used in FTTP networks: an integrated terminal closure and a pre-stubbed terminal. A pre-stubbed terminal includes an installed multi-fiber cable which may vary in length from 50 ft to 5000 ft. The end of this multi-fiber cable, which connects to the terminal, typically has between 4 to 12 fibers that are each terminated with a standard fiber optic connector such as an SC APC connector. The other end of this cable may be connected to a distribution cable in a distribution splice closure or a distribution cabinet using either mechanical or fusion splices. This pre-connectorized end of the multi-fiber cable may be provided separately or may be pre-installed in the pre-stubbed terminal when supplied to the customer.

One purpose of the fiber terminal is to protect the junction of this multi-fiber cable to the individual drop cables that provide service to each end user.

Figure 16:
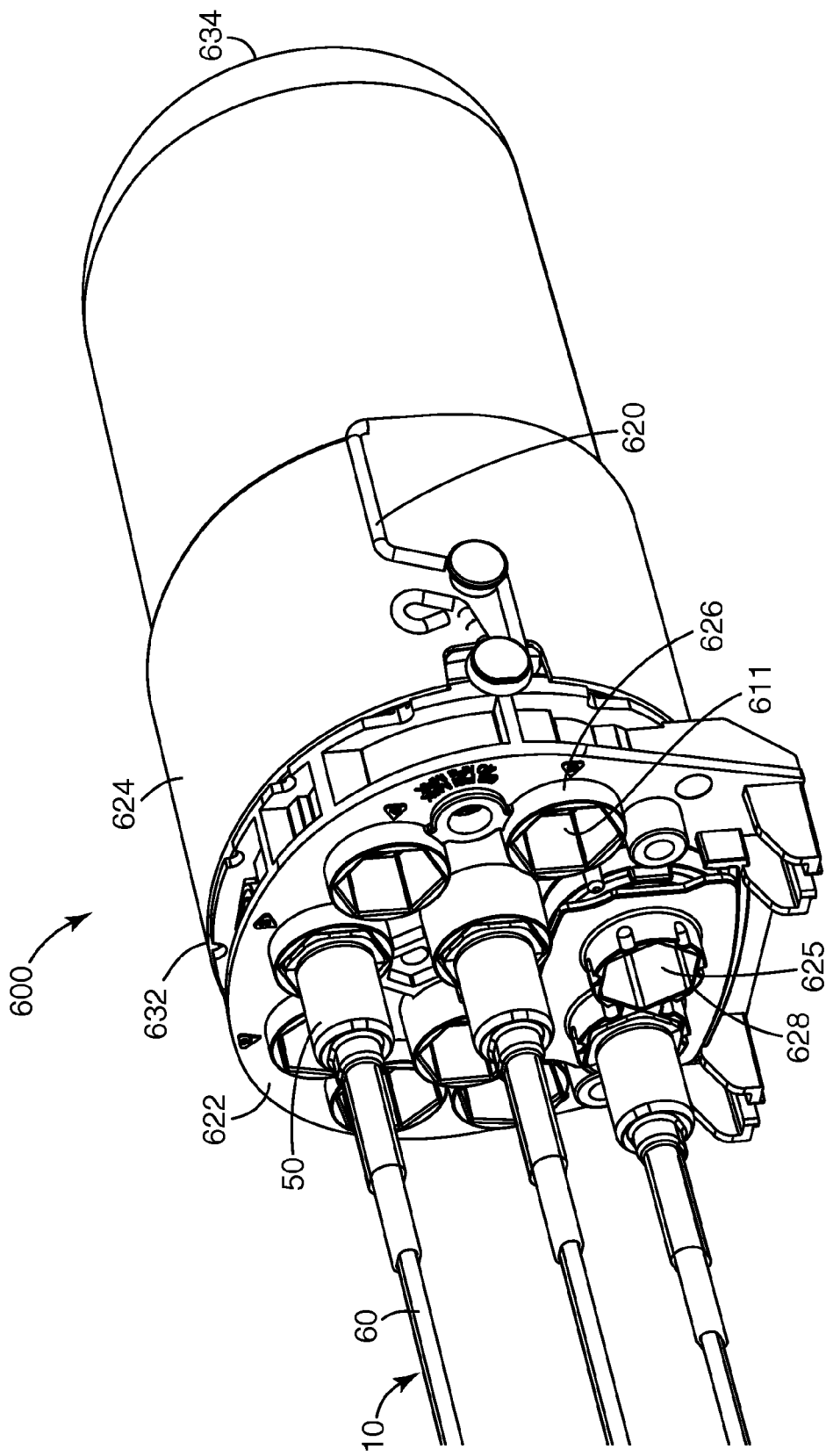
FIG. 16 shows an isometric view of a telecommunications enclosure according to an embodiment of the present invention.

An exemplary telecommunications enclosure or pre-stubbed terminal 600 according to one embodiment of the invention is illustrated in FIG. 16. Enclosure 600 includes a base 622 and a cover or housing 624 removably securable to the base 622. The base 622 includes at least one port 626 for receiving an optical fiber cable assembly 10, 100 which are shown in FIGS. 1A and 1C. The base 622 may have one, two, or any other number ports 626 as is required for a particular enclosure 600. The housing 624 is hollow and defines a longitudinal internal cavity extending from a first end 632 to a second end 634 of the housing 624. An opening at the first end 632 of the housing 624 is shaped and sized to fit over and engage with the base 622 in a conventional manner. The housing 624 may be secured to the base 622 by a bail or clamp 620. When engaged, the base 622 and housing 624 provide protection for the internal components of the terminal 600 from weather, insects and other external hazards.

In an exemplary embodiment, the housing 624 and the cavity formed therein are substantially oval in transverse cross-section, and the closed second end 634 of the housing 624 is substantially dome-shaped. The base 622 has a substantially oval cross-section in the transverse direction that matches the shape of the open end of the housing 624. However, in practice, the shapes of the base 622 and housing 624 are not so limited, and in other embodiments the housing 624 and base 622 may have other shapes and cross-sections. For example, shape of the transverse cross-section of the housing 624 and base 622 may be substantially circular, rectangular, square, or any other shape as is required or desired for a particular application. The closed second end 634 of the housing 624 may likewise be any suitable shape. In other embodiments, the closed second end 634 of the housing 624 is not monolithically formed with the remainder of the housing 624, as shown in the illustrated embodiment. For example, in other embodiments the housing 624 may comprise an assembly of components, such as a longitudinal hollow body having two open ends, wherein a cap or other similar device is used to form the closed second end 634.

The base of enclosure 600 can include one or more ports for receiving multi-fiber telecommunications cable assemblies 100. In addition, one or more ports can be configured to allow passage of one or more drop cable assemblies 10 having an inlet device 50 which supply service to a particular customer or premise. Optionally a plug may be fitted into a port of a pre-stubbed terminal to fill the ports prior to the installation of a drop cable assembly 10.

For this purpose, at least a portion of the ports may have a special shape, corresponding to the shape of the orientation control section of the unibody housing and will be described below.

The port structure includes an inlet passageway 611 that extends from a front end 627 of the port 626 to the back end 628 of the port. At its front end, the inlet passageway 611, i.e. the inside wall 629 (FIG. 19) of the port has a reduced outlet portion which permits the second end 210 of the inlet device 50 (FIG. 2), including the lock engagement feature 273, to pass through easily, but which does not let the larger diameter orientation control section pass through.

The rear half of the inlet passageway 611 can be hexagonal in shape, i.e. it can have a female shape corresponding to the hexagonal outside surface of the orientation section of the inlet device. When the inlet device 50 is seated in the port as shown in FIG. 16, the orientation control section 250 is inserted at least partially into the hexagonal inlet 625 of the passageway 611, thereby preventing rotation of the inlet device in port 626. This configuration can allow the cable inlet device to withstand external torsion stresses that may be exerted subsequently on the cable 60. Alternatively, the rear half of the inlet passageway 611 may include another internal structure that corresponds to the external cross-sectional shape of the orientation control section of inlet device 50.

The port may have a shoulder or transition (not shown) between the larger diameter rear portion of the inlet passageway and the reduced outlet portion of the inlet passageway. This shoulder can prevent inlet device from being inserted completely through the port.

Sealing member 275 (FIG. 4) is positioned in an annular channel 270 in the unibody housing 200. The annular channel may be situated just in front of the abutment surfaces 252 of the orientation control section 250. When the inlet device is seated in the port as shown in FIG. 16, the sealing member is pressed between the annular channel and the inside wall of the passageway 611 to provide an environmental seal.

Figure 17:
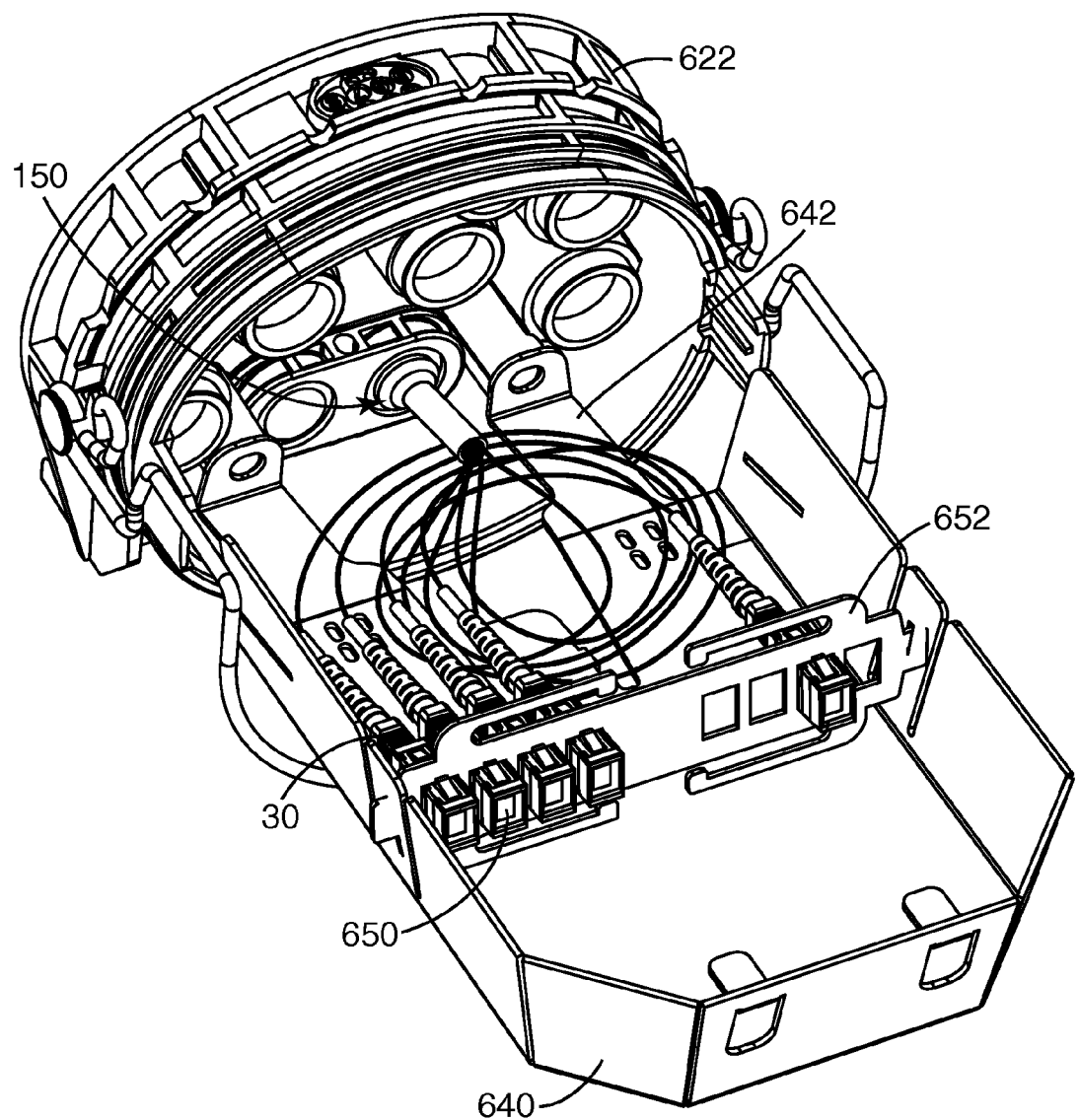
FIG. 17 shows an isometric view of an internal structure of telecommunications enclosure according to an embodiment of the present invention.
Figure 18:
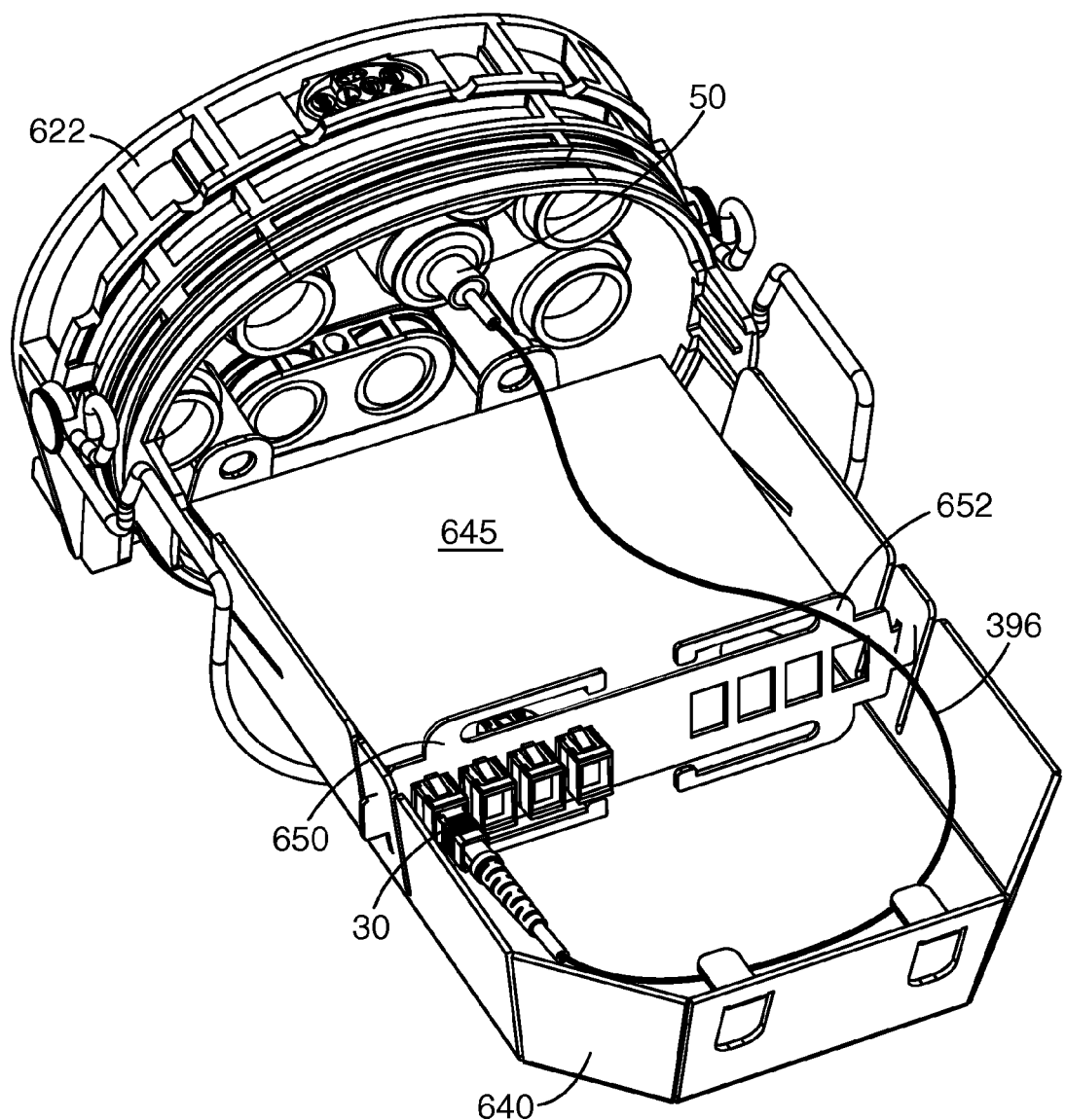
FIG. 18 shows an isometric view of an internal structure of telecommunications enclosure according to another embodiment of the present invention.
Figure 19:
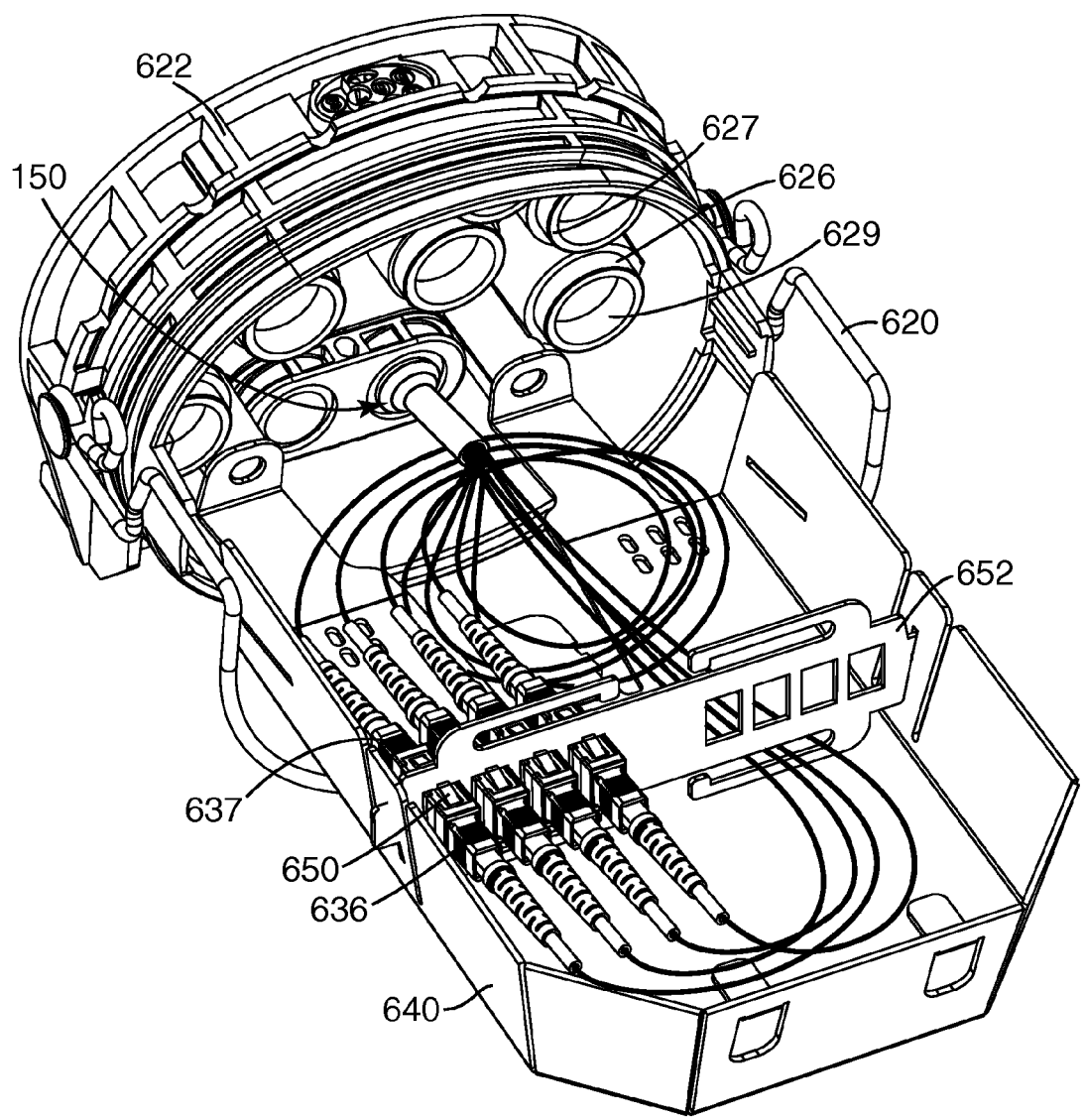
FIG. 19 shows an isometric view of an internal structure of telecommunications enclosure according to another embodiment of the present invention.

A support frame 640 can be secured to the base 622 by one or more mounting bracket portions 642 extending from the frame 640 as shown in FIG. 17-19. The mounting bracket portions 642 can be configured to be secured to the base 622 by bolts or screws. In other embodiments, the support frame 640 may be secured to the base 622 by any conventional mechanism including, but not limited to bolts, screws, interlocking elements on the frame 640 and base 622, adhesive, or any other suitable devices or materials.

In one aspect, the support frame 640 is shaped to extend longitudinally into the internal cavity of the housing 624 when enclosure 600 is closed.

In one embodiment, mounting bracket portions 642 can be integrally formed with support frame 640, such as by stamping frame 640 and mounting bracket portions 642 from a single piece of sheet metal, molding frame 640 and mounting bracket portions 642 as a single unit, or overmolding frame 640 onto mounting bracket portions 642. In another embodiment, mounting bracket portions 642 can be separately formed from support frame 640 and then secured to frame 640 using any suitable conventional means, such as screws, bolts, welding, adhesive, snap-fit, mechanical interference fit, etc.

In the embodiments and implementations described herein, the various components of the enclosure 600, support frame 640, and elements thereof are formed of any suitable material. The materials are selected depending upon the intended application and may include both polymers and metals. In one embodiment, the base 622 and housing 624 are formed of polymeric materials by methods such as injection molding, extrusion, casting, machining, and the like, while the support frame 640 and components thereof are formed of metal by methods such as molding, casting, stamping, machining, and the like. Material selection will depend upon factors including, but not limited to, chemical exposure conditions, environmental exposure conditions including temperature and humidity conditions, flame-retardancy requirements, material strength, and rigidity, to name a few.

In an embodiment of a pre-stubbed terminal, a multi-fiber cable includes an inlet device 150 mounted thereon. The fibers of the multi-fiber are spliced to the fibers of individual drop cables using either fusion or mechanical splices. For this exemplary embodiment, a splice insert (not shown) or a plurality of mechanical splice holders (not shown, but described in commonly owned U.S. Patent Publication No. 2006-0067637, incorporated by reference herein in its entirety), may be attached to the frame 640 to hold the splices used to connect the multi-fiber cable to the individual drop cables.

In another embodiment as is shown in FIG. 17, a pre-stubbed terminal includes a multi-fiber cable assembly having an inlet device 150 mounted in the base 622 of the pre-stubbed terminal. The multi-fiber cable assembly is pre-terminated with a plurality of optical connectors 30. The connectors may be fitted into a coupling field 650 mounted on a bracket 652 attached to support frame 640. FIG. 18 shows a pre-terminated optical drop cable assembly having an inlet device 50 mounted in base 622 connected to the pre-terminated multi-fiber cable assembly using the coupling field 650. A separation plate 645 can be mounted on frame 640 to separate the fibers of the multi-fiber cable from the fibers of the drop cables to protect and prevent tangling.

Another feature of the separation plate is that it provides craft separation in the enclosure. The multi-fiber cable assembly may be pre-installed in the closure at the factory and the separation plate added. The pre-stubbed terminal can then be installed in the FTTH network by splicing the second end of the multi-fiber cable in a splice closure. When the service provider needs to set up service for a particular end user, the service provider can send a craftsman to install a drop cable assembly 10, as shown in FIG. 1A, between pre-stubbed terminal and the end user. The craftsman can insert a pre-terminated drop cable assembly 10 having an inlet device 50 mounted on one end into a free port 626 (FIG. 19) in the base 622 of a pre-stubbed terminal and lock it in place by inserting a keying mechanism such as a forked locking key 276 (FIG. 15) into the lock engagement feature 273 on the unibody housing 200 of the inlet device. The craftsman then simply plugs the optical connector 30 on the end of the pre-terminated drop cable assembly into the designated coupler in the coupling field 650 in the terminal.

Figure 20:
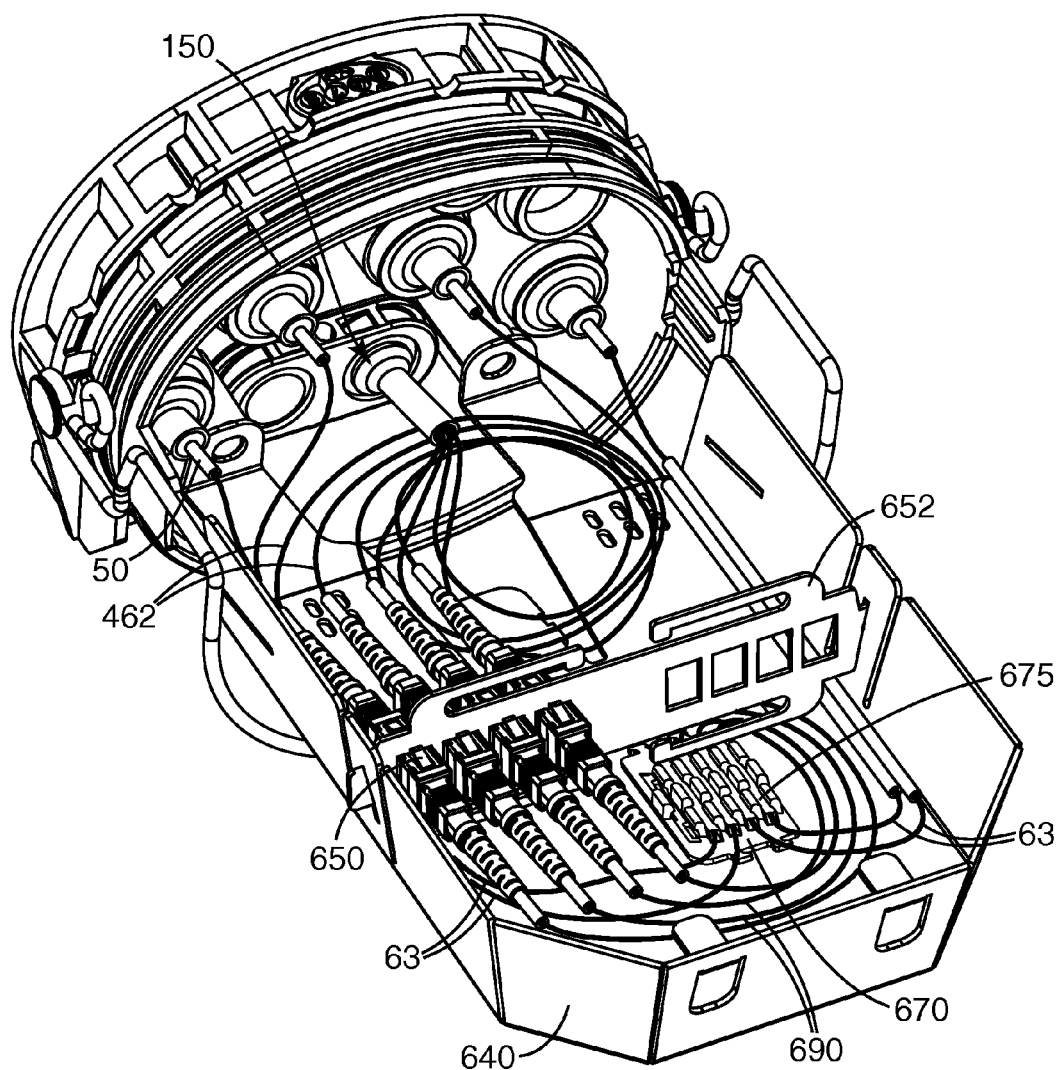
FIG. 20 shows an isometric view of an internal structure of telecommunications enclosure according to another embodiment of the present invention.

In another embodiment as is shown in FIG. 20, the pre-stubbed terminal includes a base 622 having a multi-fiber cable assembly having an inlet device 150 mounted therein. The multi-fiber cable assembly is pre-terminated with a plurality of optical connectors 30. An optical drop cable having an inlet device 50 mounted thereon may be spliced to short fiber pigtails 690 using either fusion or mechanical splices 675. For this embodiment, a splice insert 670 or a plurality of splice mechanical splice holders (not shown), described in commonly owned U.S. Patent Publication No. 2006-0067637, incorporated by reference herein in its entirety, may be attached to the frame 640 to hold the splices used to connect the individual drop cables to fiber pigtails 690. The connectors 30 on the pre-terminated multi-fiber cable assembly may be joined to the fiber pigtails 690 using a coupling field 650 mounted on a bracket 652 attached to frame 640. Alternatively, the pre-stubbed terminal may be fitted with a fiber cable assembly, such as a single fiber cable assembly or a multi-fiber cable assembly, and an optical device module to separate the signals carried on that single fiber into a plurality signals to be carried to a plurality of end users by individual drop cable assemblies, for example as shown in FIG. 25.

Figure 25:
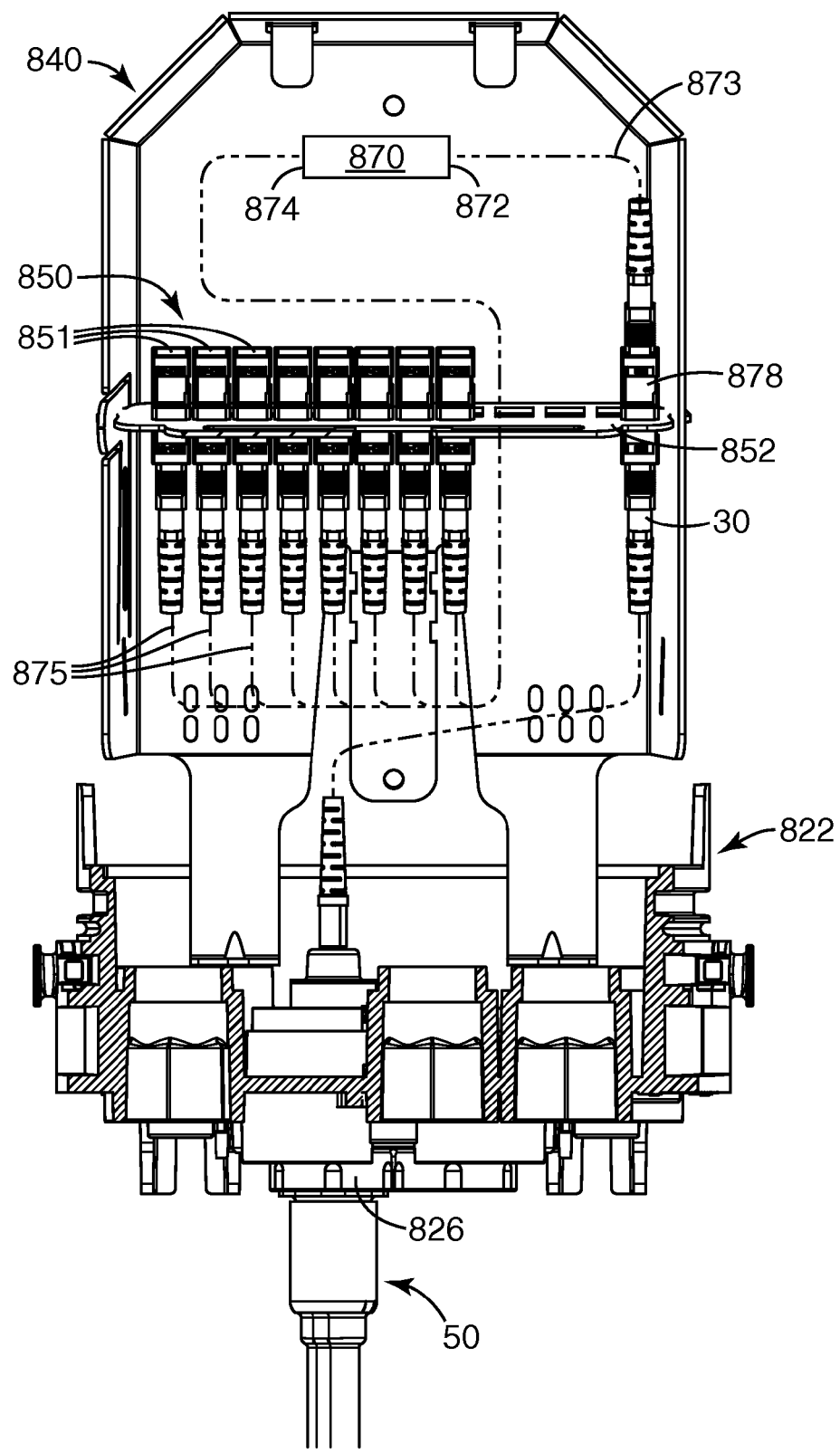
FIG. 25 shows a schematic view of a telecommunications enclosure according to another embodiment of the present invention including an optical device module.

FIG. 25 shows an alternative pre-stubbed terminal that includes a housing (not shown) and a base 822 having a preconnectorized single fiber cable assembly having an inlet device 50 mounted in a port 826 thereof. The single fiber cable assembly can be connected to an input portion 872 of an optical device module 870. The optical device module 870 may separate signals carried on the optical fiber for distribution to a plurality of drop cable assemblies (not shown) attached to an output portion 874 of the optical device module 870.

The optical device module may include a 1×N splitter, 2×N splitter, and/or wavelength division multiplexer coupler. For example, the optical device module shown in FIG. 25 is a 1×8 splitter module.

The optical device module 870 may be preconnectorized with standard optical fiber connectors on the input and output fibers 873, 875 extending from an input portion 872 and an output portion 874 of the optical device module 870, respectively. FIG. 25 shows an optical device module having the input portion 872 and the output portion on opposite sides of the optical device module. However, having the input portion and the output portions on the same side of the optical device module or on adjacent sides of the optical device module should be considered within the scope of the current invention. The connector 30 on the single fiber cable assembly may be connected to input fiber 873 by an input connector coupling 878. The input connector coupling 878 may be secured to support frame 840 or positioned in bracket 852 which is secured to support frame 840. Each of the output fibers 875 may be attached to a drop cable assembly using one of the connector couplings 851 in the coupling field 850 mounted on a bracket 852 which is secured to support frame 840. After the optical device module 870 has been coupled to the single fiber cable assembly and the connectors on the output fibers 875 of the optical device module have been installed in the couplings 851 in connector field 850, the optical device module 870 may be secured to the support frame with conventional mechanical fasteners (i.e. by screws or a hook and loop fastener, for example), double sided tape or a securing strap.

The use of a pre-connectorized optical device module can be advantageous because it offers plug and play installation and can eliminate the need to splice the optical fibers in the field when used in conjunction with the single fiber and/or multi-fiber cable assemblies described herein. Another advantage of this approach can be that the terminal and single fiber cable assembly may be installed when the network is being set up, and the cost of optical device module may be delayed until service is needed by the end customer. Additionally, the capacity of the terminal may be increase by replacing a 1×4 optical splitter with a 1×8 or a 1×16 optical splitter, thus doubling or even quadrupling the number of drops cables served by a single terminal enclosure.

Figure 26:
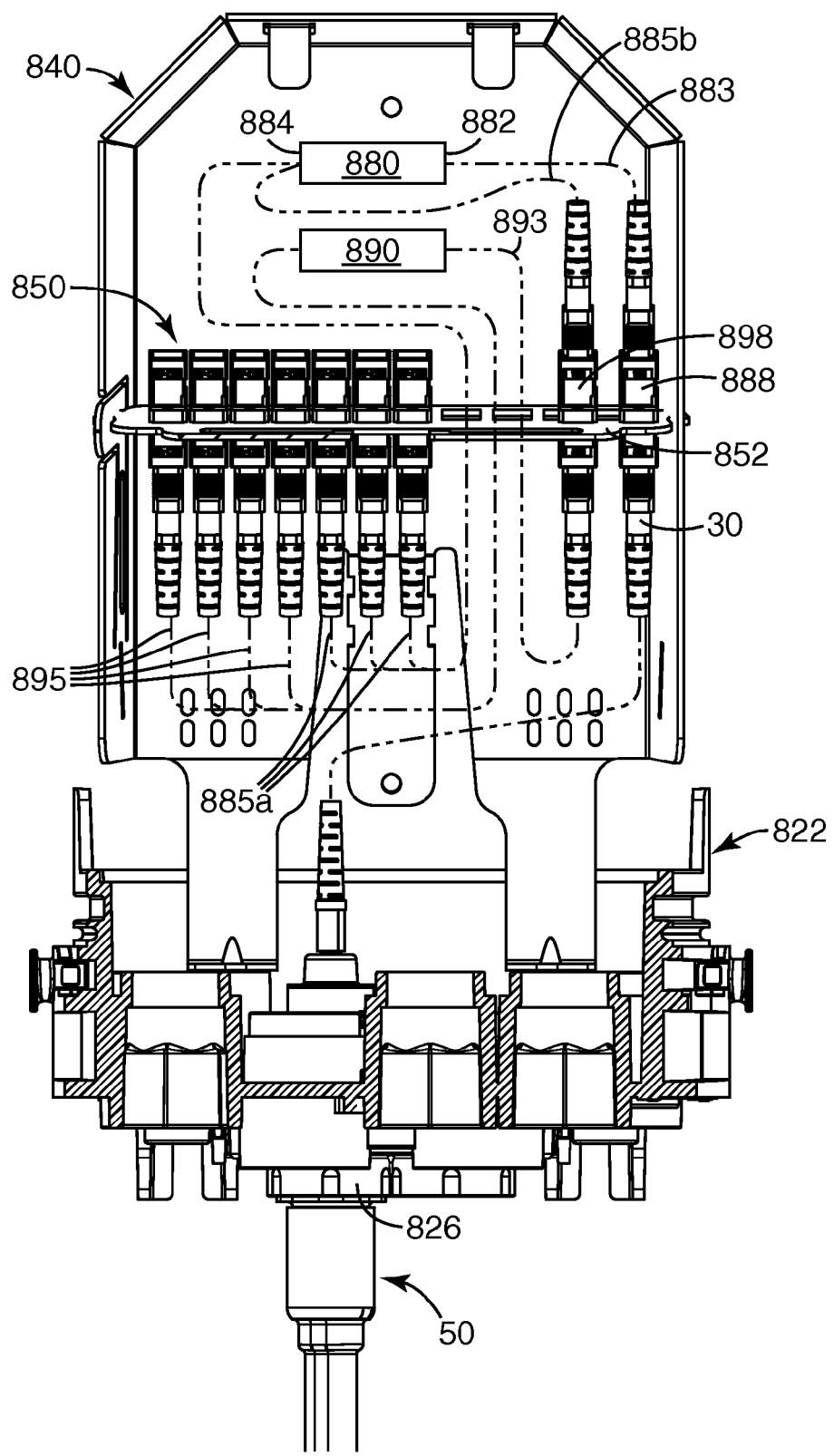
FIG. 26 shows a schematic view of a telecommunications enclosure according to another embodiment of the present invention including a plurality of optical device modules.

An alternative method of increasing the capacity of the terminal enclosure is to add a plurality of optical device modules into the terminal enclosure. FIG. 26 shows an exemplary embodiment where a plurality of optical devices (e.g. splitter modules) can increase the capacity of the pre-stubbed terminal enclosure. This exemplary pre-stubbed terminal includes a housing (not shown) and a base 822 having a preconnectorized single fiber cable assembly having an inlet device 50 mounted in a port 826 thereof. The single fiber cable assembly can be connected to an input portion 882 of a first optical device module 880. The first optical device module 880 may separate signals carried on the optical fiber from the single fiber cable assembly for distribution to a plurality of drop cable assemblies (not shown) attached to the output portion 884 of the optical device module 880. As shown in FIG. 26, the first optical device module is a 1×4 preconnectorized splitter module. The first optical device has one input fiber 883 and four output fibers 885a, 885b.

The connector 30 on the single fiber cable assembly may be connected to input fiber 883 by a first input connector coupling 888. The input connector coupling 888 may be secured to support frame 840 or positioned in bracket 852 which is secured to support frame 840. In an exemplary embodiment, three of the output fibers 885a of the first optical device may be connected to drop cable assemblies (not shown) using the connector couplings 851 in the coupling field 850 mounted on a different portion of bracket 852. After the first optical device module 880 has been coupled to the single fiber cable assembly and the connectors on the output fibers 885 of the first optical device module 880 have been installed in the couplings in connector field 850, the remaining output fiber 885b may be routed to a second input connector coupling 898.

A second optical device module 890 can be cascaded with the first optical device module 880 to even further increase the capacity of the pre-stubbed terminal by connecting the input fiber 893 of the second optical device module 890 to output fiber 885b from the first optical device module 880 in the second input connector coupling 898. As shown in FIG. 26, the second optical device module 890 is a 1×4 preconnectorized splitter module. The four output fibers 895 from the second optical device module 890 can be used to connect four additional drop cable assemblies (not shown) through the coupling field 850.

The first and second optical device modules 880, 890 may be secured to the support frame with conventional mechanical fasteners (i.e. by screws or by a hook and loop fastener), double sided tape or a securing strap (not shown).

This cascaded expansion technique allows a capacity increase for the pre-stubbed terminal without disruption of service to customers connected to the first optical device module 880 by output fibers 885a. This structure allows for incremental capacity increases by adding additional splitter modules when more service points are needed.

Alternatively, a parallel optical device arrangement is also contemplated where the single fiber cable assembly is replaced by a multi-fiber cable assembly. Each of the fibers in the multi-fiber cable assembly may be connected to a separate optical device module which in turn can be connected to a plurality of drop cable assemblies.

While the use of preconnectorized optical device modules has been described with respect to a preterminated terminal, it should be understood that this approach may be utilized for any telecommunication enclosure in which preterminated cable assemblies (e.g. single fiber cable assemblies or multi-fiber assemblies) are used. For example, this capacity expandability approach may be used in aerial enclosures, fiber distribution units or hubs, optical network terminals, wall mount boxes and the like.

In another embodiment as is shown in FIG. 19, a pre-stubbed terminal includes base with a multi-fiber cable assembly having an inlet device 150 mounted thereon. The multi-fiber cable assembly is pre-terminated with a plurality of optical connectors 30. The cable assembly may be installed in the terminal to allow loop-back testing of the connection once it has been spliced into a distribution line in a splice closure. A coupling in the coupling field 650 in this embodiment can have a first optical connector 636 mounted on a first optical fiber in the multi-fiber cable linked to a second optical connector 637 mounted on a second optical fiber in the multi-fiber cable. This configuration can allow the lines of the pre-stubbed terminal to be tested from a distribution closure, a distribution cabinet or a central network facility, thus, providing verification of the lines prior to connecting the drop cables to distribute the final service to the end user. A form of loopback testing is described more fully in commonly owned U.S. Patent Publication No. 2007-0189695-A1, incorporated by reference herein in its entirety.

Figure 23:
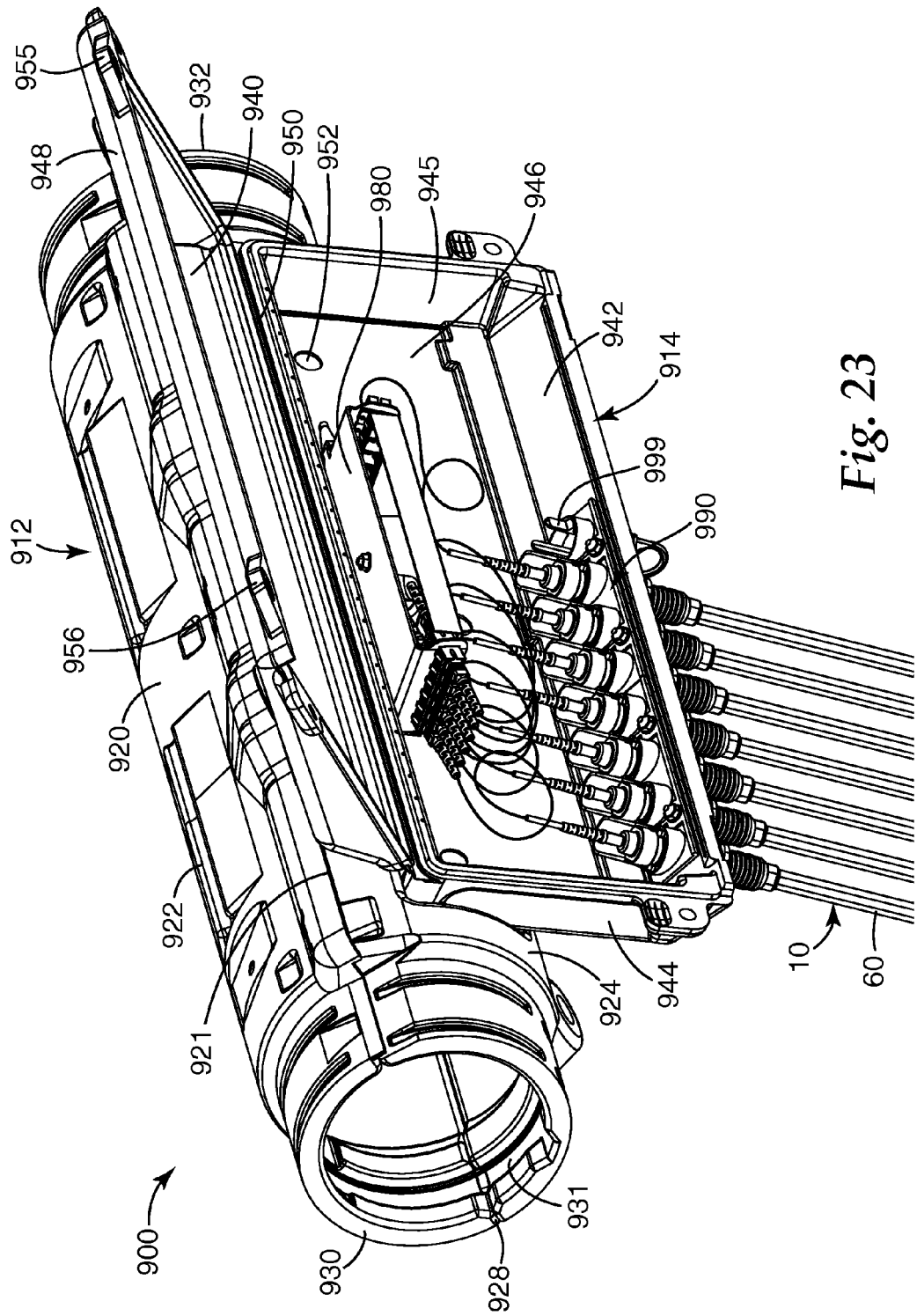
FIG. 23 shows an isometric view of a telecommunications enclosure according to another embodiment of the present invention.

In another exemplary embodiment shown in FIG. 23, a telecommunication enclosure 900 includes an integral splice closure 912 and a terminal closure 914. As illustrated, enclosure 900 is an above-grade (i.e., above-ground) enclosure, adapted to be suspended from a support cable by means of a pair of hangers (not shown).

Splice closure 912 comprises a casing 920 which may be opened along an edge or opening seam 921, having mating ridges and grooves to form a labyrinth-type seal for restricting the ingress of dirt, water, bugs, and the like, into casing 920. Generally, casing 920 comprises first and second semi-cylindrical casing sections 922, 924 that are rotatably connected to one another along a hinge 928. In one embodiment according to the invention, hinge 928 may be integral with casing sections 922, 924. Preferably, enclosure 900 is molded from a suitable polymer material, such as polyethylene or the like. Enclosure 900 may be made by any conventional molding technique, such as blow molding, injection molding, and the like.

As seen in FIG. 23, splice closure 912 has an elongated, substantially cylindrical shape with first and second opposite ends 930, 932. End seals (not shown) are disposed at first and second ends 930, 932 for receiving and sealing around telecommunication cables (not shown) entering casing 920. End seals, which may be formed according U.S. Pat. No. 4,857,672, incorporated by reference herein, are supported in recesses 931 in first and second ends 930, 932 of splice closure 912.

The splice closure may be opened to provide access to the enclosed splice area within casing 920 by the rotating the first casing section 922 (in the upper position) relative to second casing section 924 (in the lower position). In particular, first and second sections 922, 924 of casing 920 are oriented such that when casing 920 is opened, a substantially unobstructed view is provided into the splice area inside casing 920. The two cylindrical casing sections 922, 924 may be secured in a closed condition by a latch or fastening device (not shown).

Section 924 of casing 920 may include a support surface for joining to and supporting thereon a terminal closure 914. The support surface is generally flat, inside and outside of casing 920 and formed with at least one opening 952 through which telecommunication lines, such as optical fibers or copper wires may pass from splice closure 912 into terminal closure 914. Support surface is positioned on a side of casing 920 below opening seam 921, such that the terminal closure 914 supported thereon is readily accessible from the side or front of telecommunication enclosure 900.

Terminal closure 914 may be joined to splice closure 912 at the support surface in any suitable manner to make splice closure 912 and terminal closure 914 a unitary structure. If splice closure 92 and terminal closure 914 are first formed as separate units, joining splice closure 912 and terminal closure 914 can be joined using e.g., pop rivets, machine screws, bolts, heat welding, sonic welding, and the like. Splice closure 912 and terminal closure 914 may alternately be molded the closures 912, 914 together as a single structure, rather than first forming them as separate units.

Terminal closure 914 comprises a top wall 940, a bottom wall 942, end walls 944, 945, back wall 946 and a lid 948. Lid 948 is hinged to top wall 940 of terminal closure 914 and is preferably hinged by a compression molded hinge 950. That is, hinge 950 is integral with top wall 940 and lid 948 of terminal closure 914. The terminal closure 914 may be molded from a suitable polymer material, such as polyethylene or the like by any conventional molding technique, such as by blow molding, or injection molding. Lid 948 and bottom wall 942 have latches 955, 956 to hold lid 948 in a closed position.

Figure 24A:
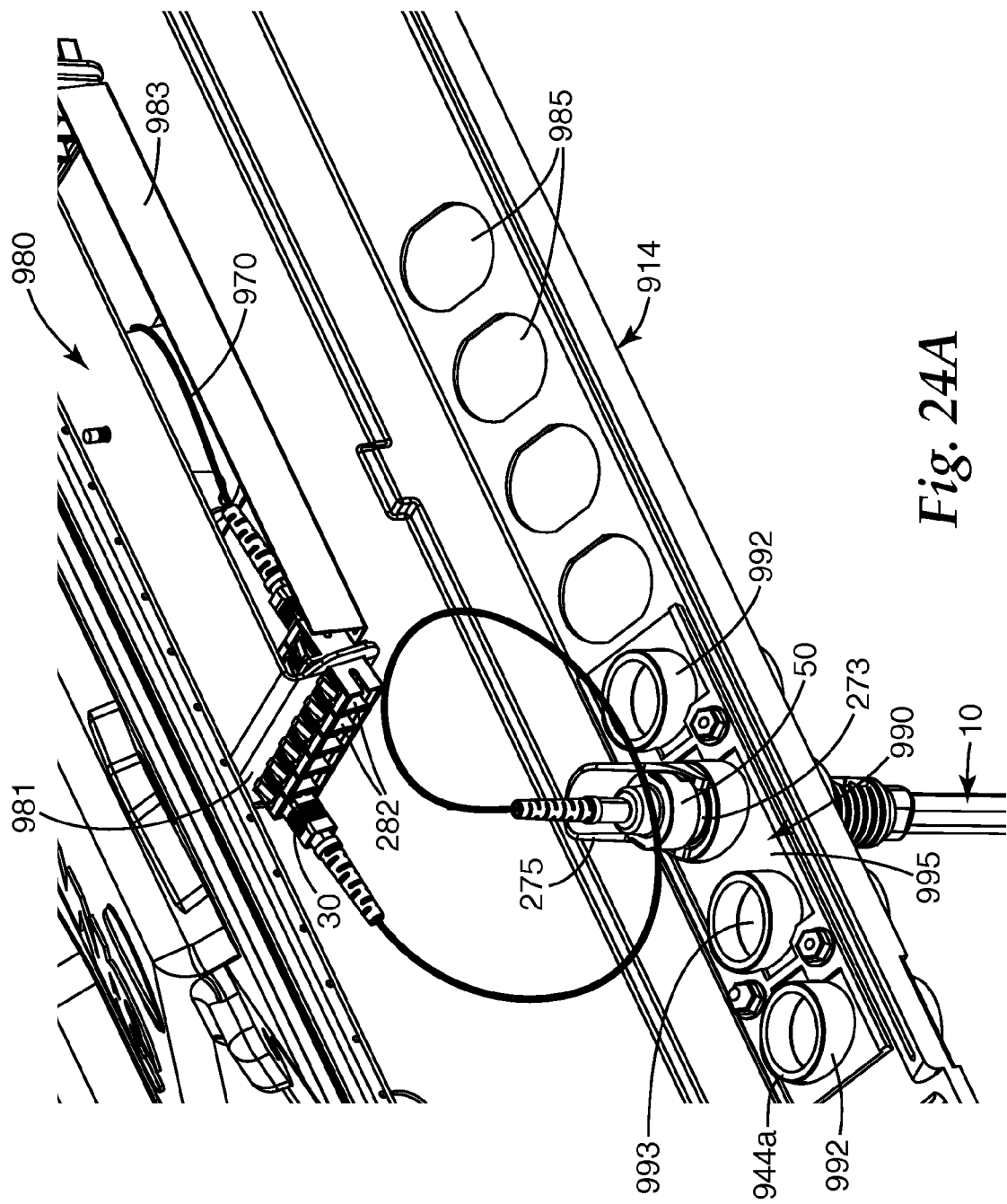
FIG. 24A shows an isometric view of a port adapter assembly installed in the telecommunications enclosure of FIG. 23.

Referring to FIGS. 23 and 24A, after one or more data lines have been spliced to optical fiber pigtails in splice closure 912, these fiber pigtails 970 may then be routed into the terminal closure through one or more opening 952. The fiber pigtails 970 may then be inserted into a coupling field 980 in the terminal enclosure. The coupling field may have one or more sets of metal brackets 981 which are sized to accept an appropriate fiber optic connector coupling 982. Optionally, the connector field may have a protective cover 983 that attaches over the portion of the coupling field into which the fiber optic pigtails 970 from the splice closure have been inserted. The coupling field may also optionally have some fiber storage capability to store excess lengths of the fiber pigtails underneath the protective cover.

Figure 24B:
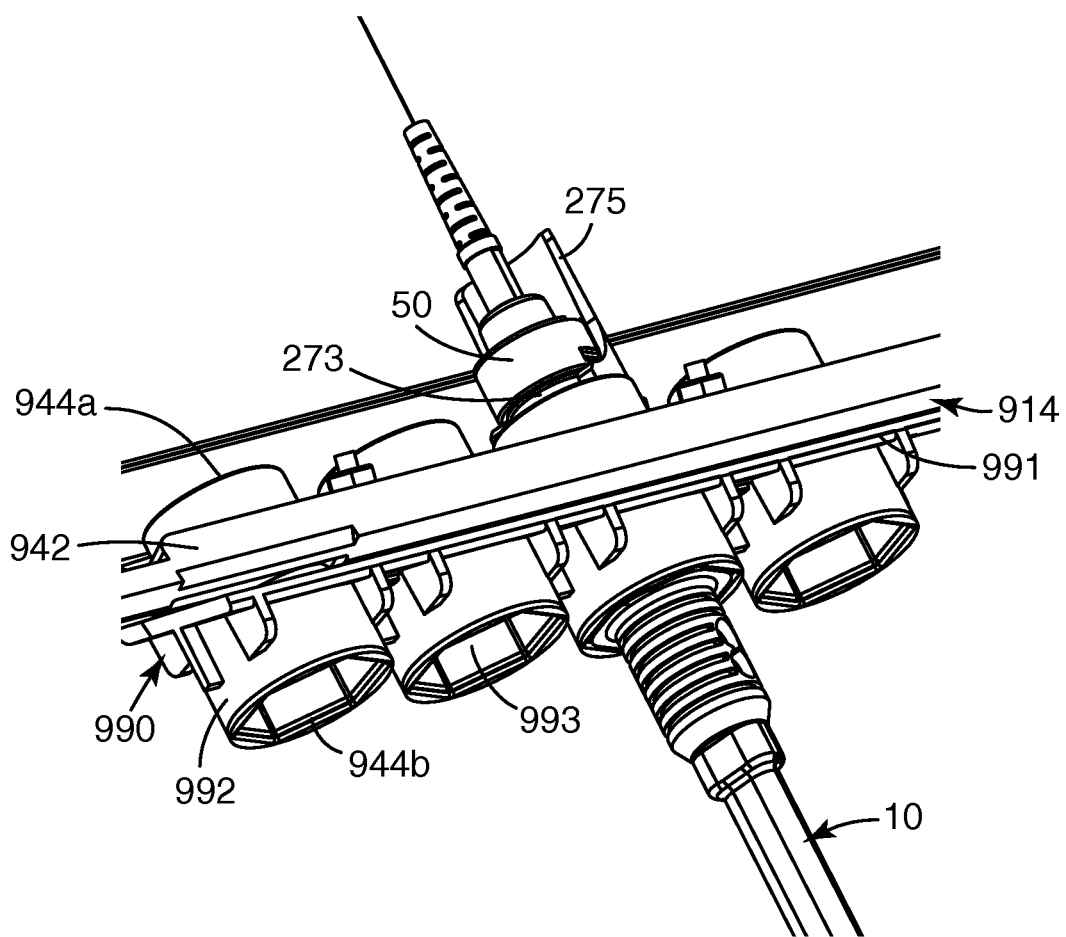
FIG. 24B shows another isometric view of a port adapter assembly installed in the telecommunications enclosure of FIG. 23.

Within terminal closure 914, the fiber pigtail may be connected to a pre-terminated drop cable assembly 10 extending outside of the terminal closure 914 as shown in FIGS. 23, 24A and 24B. In an exemplary use of telecommunication enclosure 900 an optical connector 30 may terminate an individual optical fiber of the drop cable 60.

If desired, all of the optical connectors 30 in terminal closure 914 may be accessed at the same time by opening the lid 948 of terminal closure 914. Accessing the optical connectors 30 may be desired or necessary, for example, during the installation of telecommunication enclosure 900 or when establishing a service connection for a new customer.

Referring to FIGS. 23, 24A and 24B, an adapter assembly 990 can be utilized to allow straightforward coupling to a drop cable assembly 10. The adapter assembly 990 includes a body portion 991 having at least two passageways or ports 992 and a reinforcing plate 995 configured to mate with the body portion. Each port 992 has a first end 994a and a second end 994b and may be sized to receive an inlet device 50 of drop cable assembly 10 therein and to permit a portion of the inlet device to pass freely through the length of the port. The adapter assembly 990 can be sized such that first ends 994a of the at least two ports 992 pass through simple cutouts or knockouts port such as cutout 985 in bottom wall 942 of terminal closure 914. The reinforcing plate 995 may be mated with the body portion 991 of the adapter assembly 990 once it has been inserted into the terminal closure. The body portion 991 and the reinforcing plate 995 may be secured to the enclosure and/or to each other using conventional mechanical fasteners, adhesives, or ultra sonic welding. FIGS. 24A and 24B shows a four port adapter assembly held in place by a bolt and nut type mechanical fastener. Other types of mechanical fasteners such as rivets, machine screws, and the like should also be considered within the scope of the current invention. Optionally, resilient sealing gaskets may be positioned between the body portion 991 and the bottom wall 942 of the terminal enclosure 914 and/or between the bottom wall 942 of the terminal closure and the reinforcing plate 995 prior to fastening the body portion and the reinforcing plate together in the event that additional environmental protection is desired.

At its first end 994a of port 992, the inlet passageway 993, i.e. the inside wall of the port, can include a reduced outlet portion. This outlet configuration permits the second end of an inlet device 50, including the lock engagement feature, to pass through easily, but does not permit the larger diameter orientation control portion to pass through.

At its second end 994b of port 992, inlet passageway 993, i.e. the rear inside surface of the port, can be hexagonal in shape, i.e. thereby providing a female shape corresponding to a hexagonal outside surface of the orientation control section 250 (FIG. 2) of the inlet device 50. When the inlet device 50 is seated in a port 992 in the adapter 990 assembly as shown in FIG. 24A, the device's orientation control section can be inserted at least partially into the hexagonal inlet of the passageway 993, thereby preventing rotation of the inlet device in the port. Thus, the cable inlet device 50 can withstand external torsion stresses that may be exerted subsequently on the cable.

The port may have a shoulder or transition (not shown) between the larger diameter rear portion of the inlet passageway and the reduced outlet portion of the inlet passageway. This shoulder can prevent inlet device from being inserted completely through the port.

FIGS. 24A-B show an inlet device 50 secured into the port adapter assembly 990 with a forked locking key 276 inserted into the lock engagement feature on the unibody housing of the device. The craftsman may then simply plug the optical connector 30 on the end of the pre-terminated drop cable assembly 10 into the designated coupler 982 in the coupling field 980 in the terminal.

Optionally, a telecommunication enclosure 900 may be fitted with one or more port adapter assemblies having plugs 999 inserted in the adapter assembly ports. FIG. 23 shows a telecommunication enclosure having one plug 999 and seven drop cable assemblies 10 installed therein. In this configuration, the telecommunication enclosure may be spliced into the distribution lines during the initial build out stage of a new development, but drop cables do not need to be added until a customer desires service. Advantageously, this defers a portion of the network upgrade until there are customers requesting service and the revenue stream is initiated.

Port Adapter

Figure 21:
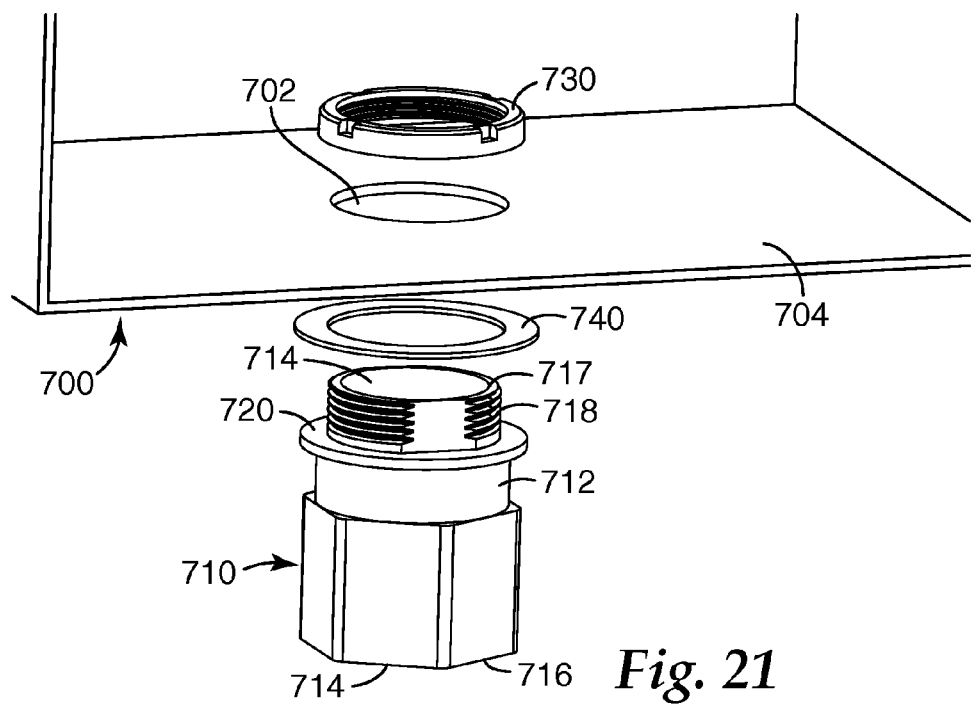
FIG. 21 shows an exploded view of a port adapter according to another embodiment of the present invention.
Figure 22:
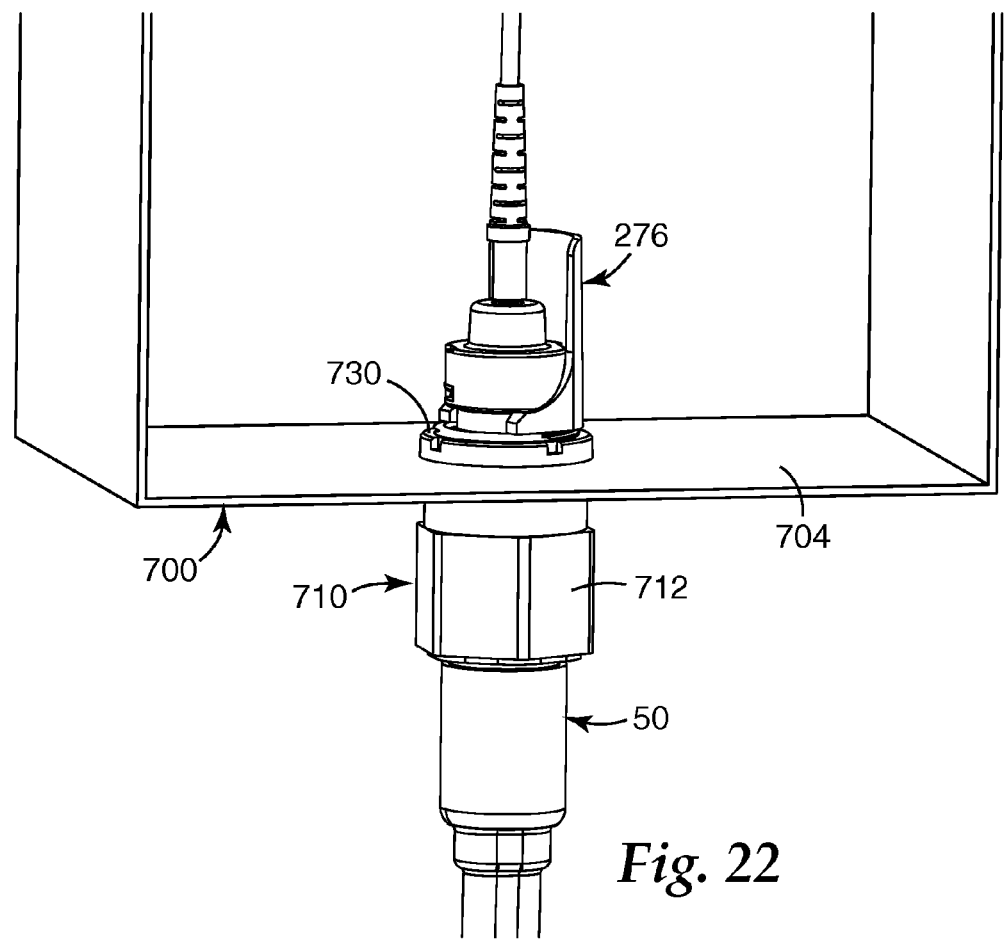
FIG. 22 shows an isometric view of a port adapter installed in a telecommunications enclosure according to another embodiment of the present invention.

Referring to FIGS. 21 and 22, an adapter is provided that allows an inlet device to be inserted into a telecommunications enclosure or ONT 700. The adapter 710 includes a body portion 712 having an inlet passageway 714 extending from a first end 717 to a second end 716. The adapter may be sized to receive an inlet device 50 therein, and to permit a portion of the inlet device to pass freely through the length of the port. A flange 720 extends laterally outward from the body portion 712. The first end 717 and flange 720 of the body portion 712 of the adapter can be sized such that first end of the adapter passes through a simple cutout or knockout port such as cutout 702 in wall 704 of ONT 700 (FIG. 21). The flange 720 prevents the adapter 710 from passing through a cutout 702. A retainer nut 730 positioned inside the ONT can engage with an external thread 718 on the first end of the adapter 710 to secure the adapter within the cutout 702. Alternatively, the adapter may be attached to the telecommunications closure by an adhesive, snap fit or other mechanical mechanism. A resilient sealing gasket 740 provides a moisture seal between the adapter and enclosure 700. Optionally, a second resilient sealing gasket and washer (not shown) may be fitted over the first end 717 of the adapter 712 once it has been inserted into the cut 702 before the retainer nut 730 is screwed into place to provide added sealing to the port. Alternatively, the port adapter may be designed to snap in place in cutout 702 of the wall 704 of ONT 700.

At its front end 717, the inlet passageway 714, i.e. the inside wall of the adapter, can include a reduced outlet portion. This outlet configuration permits the second end of an inlet device 50, including the lock engagement feature, to pass through easily, but does not permit the larger diameter orientation control portion to pass through.

The back end 716 of the inlet passageway 714, i.e. the rear inside surface of the adapter 710, can be hexagonal in shape, i.e. thereby provides a female shape corresponding to a hexagonal outside surface of the orientation control section 250 (FIG. 2) of the inlet device. When the inlet device is seated in the port adapter as shown in FIG. 22, the orientation control section can be inserted at least partially into the hexagonal inlet of the passageway 714, thereby preventing rotation of the inlet device in the port. Thus, the cable inlet device 50 can withstand external torsion stresses that may be exerted subsequently on the cable.

The port may have a shoulder or transition (not shown) between the larger diameter rear portion of the inlet passageway and the reduced outlet portion of the inlet passageway. This shoulder can prevent inlet device from being inserted completely through the port.

The sealing member 275 can be placed in annular channel 270 in the unibody housing 200 (FIG. 2). The annular channel can be situated just in front of the abutment surfaces of the orientation control section. When the inlet device is seated in the port adapter as shown in FIG. 22, the sealing member is pressed between the annular channel and the inside wall of the passageway 714 to provide an environmental seal.

As shown in FIG. 22, an inlet device 50 can be secured into the port adapter with a forked locking key 276 inserted into the lock engagement feature on the unibody housing of the device.

In some embodiments, a multi-port assembly is used in place of the port adapter described above. Examples of these multi-port adapter assemblies are shown in FIGS. 23, 24A and 24B. Multi-port adapter assemblies have at least two ports. For example, the port adapter assembly shown in FIG. 23 has eight ports and the port adapter assembly shown in FIGS. 24A and 24B has 4 ports. The number of ports in the port assembly adapter can be based on the capacity of the telecommunication enclosure in which it is to be used.

Pulling Sock

In another embodiment, a pulling sock may be used in conjunction with the disclosed inlet device 50, 150 to package and protect the end of the cable assemblies 10, 100 and to facilitate pulling the cables through conduits if required. The pulling sock can be designed so that it accommodates the inlet device and any additional parts that may be needed to install the inlet device in a telecommunications enclosure.

Figure 14:
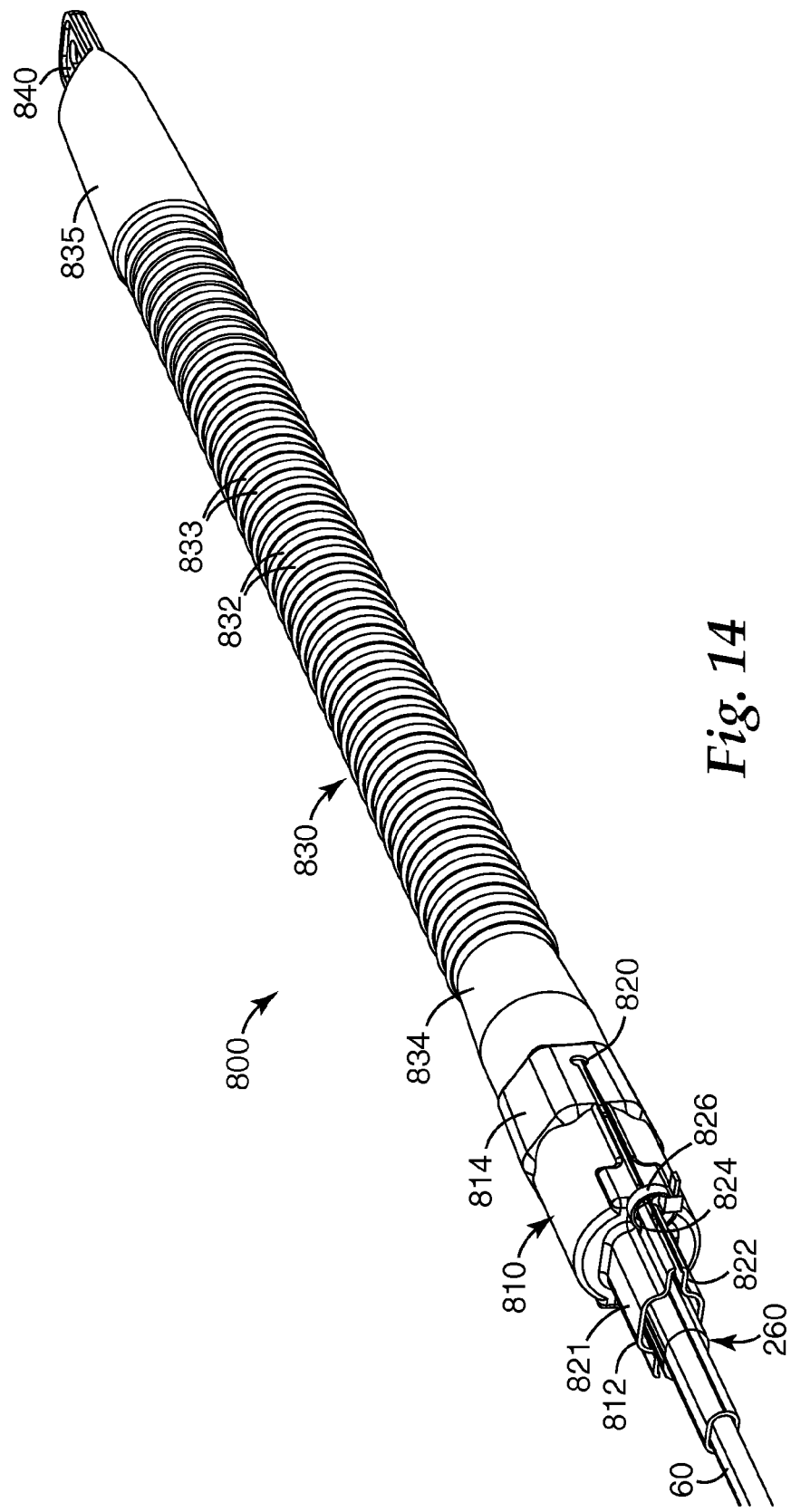
FIG. 14 shows an isometric view of a pulling sock according to an embodiment of the present invention.
Figure 15:
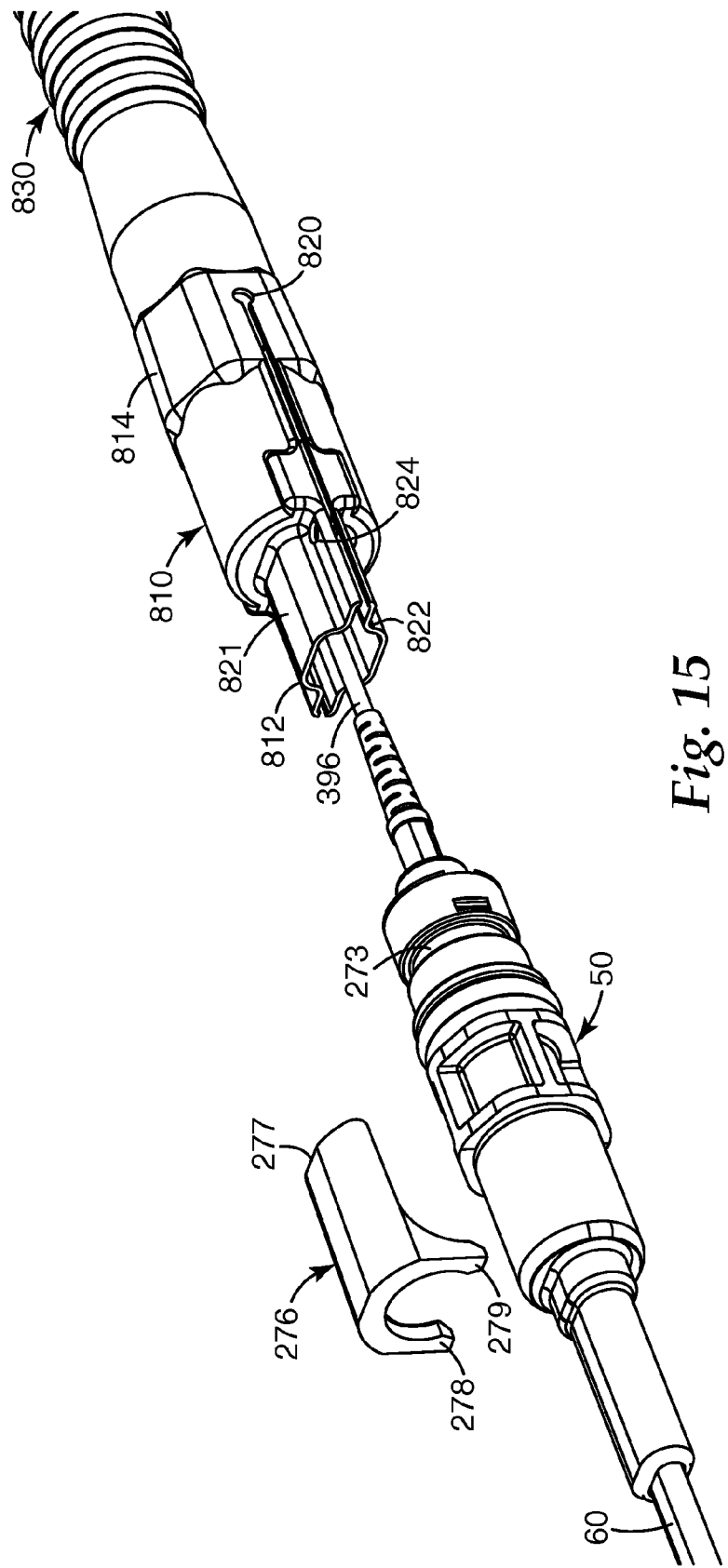
FIG. 15 shows a detailed isometric view of a pulling sock according to an embodiment of the present invention.

FIGS. 14 and 15 show two views of an exemplary pulling sock 800. In an exemplary aspect, the pulling sock comprises a single part having a form fitting inlet device receiving section 810, a trunk 830 and a pulling loop 840.

The inlet device receiving section 810 may be generally configured to have an internal shape similar to the external shape of the unibody housing 200 of the inlet device (50, 150). In particular, the inlet portion 812 can be configured to fit snugly over the cable sealing and strain relief member 260. A portion 814 of inlet device receiving section 810 may be configured to the shape of the orientation control section of the unibody housing 200 having a hexagonal shape as shown in FIG. 14, although other shapes may also be considered within the scope of the present invention. When the inlet device (50, 150) is inserted into the inlet device receiving section 810 of the pulling sock, the sealing member on the unibody housing 200 fits snugly in the end of the trunk 830 to seal the pulling sock.

The inlet device receiving section 810 further includes two arms 821, 822 separated by pair of slits 820, one on either side of the receiving section. Separation of the arms facilitates insertion of the inlet device with the locking key installed into the pulling sock. The arms may also have a pair of holes 824 on either side of each arm. For example, a pair of cable ties may be fastened through the pair of aligned holes 824 in the arms of the sock on either side of the inlet device to secure the device in the pulling sock. Alternatively, a single cable tie may be used to close the arms by wrapping it circumferentially around the inlet portion of the pulling sock. Other alternative mechanical devices to close the arms of the pulling sock can also be considered, such as having a pair of posts or mushroom caps on a first arm 821 of the sock which can intermate with a pair of holes located on the second arm 822 of the pulling sock.

The trunk 830 should be of sufficient length to house the unterminated or terminated ends of the optical fibers. The trunk includes a long cylindrical portion 834 and a closed dome shaped end at the second end 835 of the pulling sock opposite the receiving section. The cylindrical portion of the pulling sock may be corrugated (i.e. having an alternating ridge 832 and groove 833 structure) to facilitate bending of the trunk section 830. This structure may be especially advantageous during installation of the cable in the fiber network when the cable is pulled through conduits which contain one or more bends. A cord, cable, or wire may be attached to the pulling loop 840 on top of the dome shaped end 835 of the pulling sock 800 to guide the pulling sock through a conduit.

The pulling sock may be formed as a single piece out of any suitable plastic material. In one embodiment, the pulling sock can be formed of polymeric materials by methods such as injection molding, blow molding, extrusion, casting, and the like. For example, these parts may be made of molded high density polyethylene or low density polyethylene.

Assembly of an Inlet Device with a Single Fiber Orifice Plate

An exemplary method of installing an inlet device 50 onto a fiber optic drop cable 60 is now described. The drop cable has a single optical fiber housed in a protective loose buffer tube having two peripheral strength members located on either side of the buffer tube as shown in FIG. 1B. About 14 in (35.5 cm) to about 24 in (71 cm) of the semi-rigid outer sheath 64 can be removed from the drop cable to expose the loose buffer tube 65 containing at least one optical fiber 63 and at least one strength member 68. The strength members can be trimmed so that they extend about 0.75 in (1.9 cm) from the end of the remaining outer sheath. A small drop of fast drying adhesive (i.e. an epoxy adhesive such as Loctite 480™ adhesive available from Henkle Loctite Corporation (Rockwood, Conn.), or a cyanoacrylate such as 3M™ Scotch-Weld™ Instant Adhesive CA8 available from 3M Company (ST. Paul, Minn.)) may be applied to the loose fiber strength members to create at least one semi-rigid strength member to facilitate assembly into the inlet device.

The primary and secondary layers 262, 264 of the cable sealing and strain relief member can be slid onto the cable.

The prepared end of the drop cable can be inserted into the first end 205 of the unibody housing 200 through passage entry 216. The loose buffer tube containing the optical fiber can be fed through the opening 231 in the strength member securing section 230 so that it extends from the second end of the unibody housing.

The strength members can be fed through the two side openings 232 in the strength member securing section 230 (as shown in FIGS. 4 and 5) which lead into the two securing wells 235 located on either side of the securing section. The cable can be pushed into the unibody housing until the strength members are fully seated in the securing wells 235. The position of the strength members in the securing wells can be verified by looking into the wells through holes 237 in the exterior wall of the unibody housing. The cable strength members can be held in the securing wells using special self tapping plastic screws which are inserted through holes 237 in the wall 201 of the unibody housing to trap the strength members between the wall of the well and the end of the screw. Optionally, an adhesive material may be placed in the passage entry 216 prior to introducing the cable to the unibody housing or the adhesive may be added to the securing well through holes 237 in the wall 201 of the unibody housing after the cable has been positioned in the housing, but before the mechanical fasteners are put in place to secure the strength members.

The primary layer 262 of the cable sealing and cable strain relief member 260 can be slid over the primary strain relief attachment surface 240. In an exemplary embodiment, the primary layer comprises an approximately 6 in (15.2 cm) long piece of adhesive coated heat shrink tubing such as ATUM-12/3-0 available from Tyco Electronics Corporation. Heat can be applied to the heat shrink tubing to collapse it tightly around the drop cable and the primary strain relief attachment surface. The secondary layer 264 of the cable sealing and cable strain relief member 260 can be slid over the attached primary layer 262 and the secondary strain relief attachment surface 245. In an exemplary embodiment, the secondary layer comprises an approximately 4 in (10.2 cm) long piece of adhesive coated heat shrink tubing such as ATUM-24/6-0 available from Tyco Electronics Corporation. Heat can be applied to the heat shrink tubing to collapse it tightly around the primary layer 262 and the secondary strain relief attachment surface 245. Optionally, an adhesive coated cold shrink tubing may be used as the primary and secondary layers of the cable sealing and strain relief member 260.

An alignment insert 265 (e.g. a short length of Tygon™ flexible tubing 265*b* available from Saint-Gobain Performance Plastics Corporation (Aurora, Ohio)) can be inserted into the c-shaped receiving area 292 of fiber retainer 290. The loose buffer tube 65 including the optical fiber can be threaded through the alignment insert. The fiber retainer can be inserted into the second end 210 of the unibody 200 housing such that the wings 294 cooperate with slots 266 in the second end of the housing to prevent the cable from rotating in the housing.

The loose buffer tube 65 can be cut about 0.25 in. (0.6 cm) to about 0.5 in (1.25 cm) from the top of the fiber retainer 290 and removed. The optical fiber can be cleaned by wiping with a commercial cable cleaner or with isopropyl alcohol. The optical fiber 63 extending out of the loose buffer tube can be threaded through the single fiber orifice plate 320.

Figure 6:
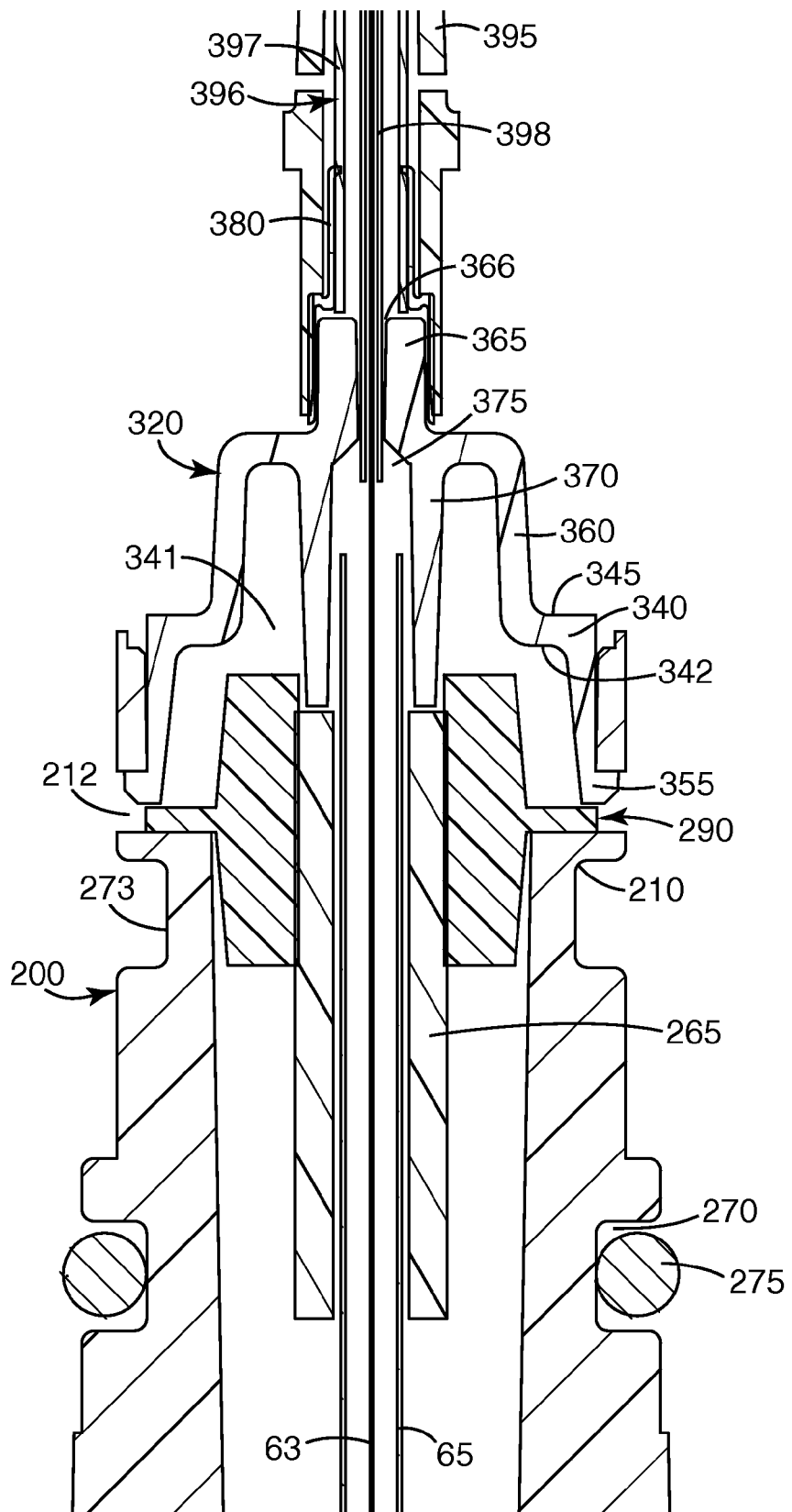
FIG. 6 shows a detailed cross-sectional view of the fiber guide device of an inlet device according to an embodiment of the present invention.

Approximately 0.5 in (1.25 cm) of jacket can be removed from a length of 3 mm jacketed fanout tubing 396 (about 12 in (30.5 cm) to about 18 in (45.7 cm)). Referring to FIG. 6, the fanout tubing includes an outer jacket 397 surrounding a smaller 900 μm tube 398 in the center. A plurality of loose fiber strength members (not shown) may be sandwiched between the jacket and the central tube. Other diameters of jacketed fanout tubing (e.g. 2.4 mm, 1.6 mm and 1 mm) are available and may be used. The free end of the optical fiber 63 is fed into tube 398 until it emerges from the other end. The fiber is held while the jacketed fanout tubing is slid toward the orifice plate 320 such that the tube 398 enters the hole 366 in fiber guide 365 and the fanout tubing's strength members can be flared out around the fiber guide. The fanout tube can be slid down until it seated against the fiber guide of orifice plate 320. A crimp ring 380 can be slid down the fanout tube and over the exposed fiber guide 365 until the loose strength members are trapped between the fiber guide 365 and the crimp ring 380. A crimp ring can be first crimped to the fiber guide. A second crimp can be performed to connect the crimp ring to the jacket 397 of the fanout tube 396. A rubber fiber strain relief boot or member 395 can be fitted over the crimp ring to control the bend radius of the fiber leaving the orifice plate. The fiber strain relief member or boot 395 may be positioned over the crimp ring to provide bend radius control at the second end of the inlet device.

Alternatively, a tube 398 alone may be used. In this case the tube may be adhesively bonded into the boss 370 and fiber guide 365 of the single fiber orifice plate.

The single fiber orifice plate 320 can then be installed into the second end 210 of the unibody housing. For example, the boss 370 on the first side 342 of the plate can be fitted over a remaining section of loose tube buffer 65 extending above the fiber retainer 290. Also the latches 355 extending from the first side 342 of base 340 can be engaged with the slots 212 located on the second end of the unibody housing. The optical fiber is drawn taut to straighten and align fiber inside the passage of the unibody housing.

Assembly of an Inlet Device with a Multi-Fiber Orifice Plate

An exemplary method of installing an inlet device onto a multi-fiber optical cable 160 is provided herein with reference to the structures shown in FIGS. 2, 8 and 9. For example, about 14 in (35.5 cm) to about 24 in (71 cm) of a semi-rigid outer sheath 164 can be removed from the cable to expose a loose buffer tube 165 surrounding a fiber ribbon cable 162 with two peripheral strength members 168 located on either side of the loose buffer tube (refer to FIG. 1D). The strength members can be trimmed so that they extend about 0.75 in (1.9 cm) for the end of the remaining outer sheath. Attachment of the cable to the unibody housing 200 including the cable retainer 290 is performed as previously described.

A plurality of sections of tubing, such as 900 μm tubing (of about 12 in (30.5 cm) to about 24 in (62.2 cm) in length), can be inserted into a plurality of orifices 466 (see FIG. 8) of the multi-fiber orifice plate 420 using an adhesive to secure the tubing to the orifice plate.

The loose buffer tube 165 can be cut about 0.25 in (0.6 cm) to about 0.5 in (1.25 cm) from the top of the fiber retainer and removed. The fibers 163 of a fiber ribbon cable 162 can be separated from each other to yield a plurality of fibers such as 250 μm fibers. Each of the fibers can be threaded through the orifice in the multi-fiber orifice plate assembly with tubing such that one fiber is provided in each protective tube. The multi-fiber orifice plate 420 can be then installed into the second end 210 of the unibody housing 200 by engaging the latches 455 extending from the first side 442 of the disc shaped base 440 with the slots 212 located on the second end of the unibody housing. The optical fibers can be drawn taut to straighten and align the fibers inside the passage of the unibody housing.

The tubing containing the optical fibers may be optionally fed through a cover assembly 470 having a funnel shaped outlet (FIG. 9). The cover can be attached to either the orifice plate 420 or the unibody housing 200. An optional piece of tubing 495 such as Tygon tubing can be slipped over the funnel shaped outlet portion of the cover to provide added strain relief to the plurality of optical fibers.

Assembly of an Inlet Device with a Multi-Fiber Fanout Device

In another exemplary method of installing an inlet device onto a multi-fiber optical cable, about 14 in (35.5 cm) to about 24 in (71 cm) of the semi-rigid outer sheath can be removed from the cable to expose a fiber ribbon cable 590 with two peripheral strength members 168 located on either side of the fiber ribbon. The strength members can be trimmed so that they extend about 0.75 in (1.9 cm) from the end of the remaining outer sheath. Attachment of the cable to the unibody housing 200, including the cable retainer 290 can be accomplished as previously described except the foam alignment insert 265a is used in place of the tubular insert 265b.

A plurality of sections of protective tubing 580, 585 such as 900 μm tubing (of about 12 in (30.5 cm) to about 24 in (62.2 cm) in length) can be placed into open channel portions 550, 552 on the distribution portion of the guide support on the fanout device 520 (see FIG. 13A) and slid down until each tube abuts the exit of the funnel shaped entrance channel portions 535, 565. In this exemplary embodiment, up to six first protective tubes 580 maybe inserted on front side 531 and up to six second protective tubes 585 may be inserted on back side 532 of the guide support 530. A small amount of adhesive (e.g. CA 8 available from 3M Company (St. Paul, Minn.) or equivalent), a small piece of adhesive tape or a combination thereof may be applied to the tubing inserted in the open channel portions 550, 552 to bond the tubing to the fanout device.

The fibers of a fiber ribbon 590 can be separated from each other to yield a plurality of fibers, such as 250 μm fibers. Each of the fibers can be inserted into a funnel shaped entrance channel portion 535, 565 from the top side of the fanout device with installed tubing. The funnel shaped entrance channel portions align with the bore 582, 586 of tubing 580, 585 in the fanout device and can provide easy assembly since alignment of the fiber to the bore in the tubing is accomplished by the fanout device. The second funnel shaped entrance channel portions 565 on the front side 561 of shelf 560 can be used to insert up to six fibers in to the protective tubing 585 attached to the back side 532 of the fanout device 520. The first funnel shaped entrance channel portions 535 on guide support 530 may then be used to insert up to six fibers into protective tubing 580 on the front side 531 of the fanout device.

Figure 13A:
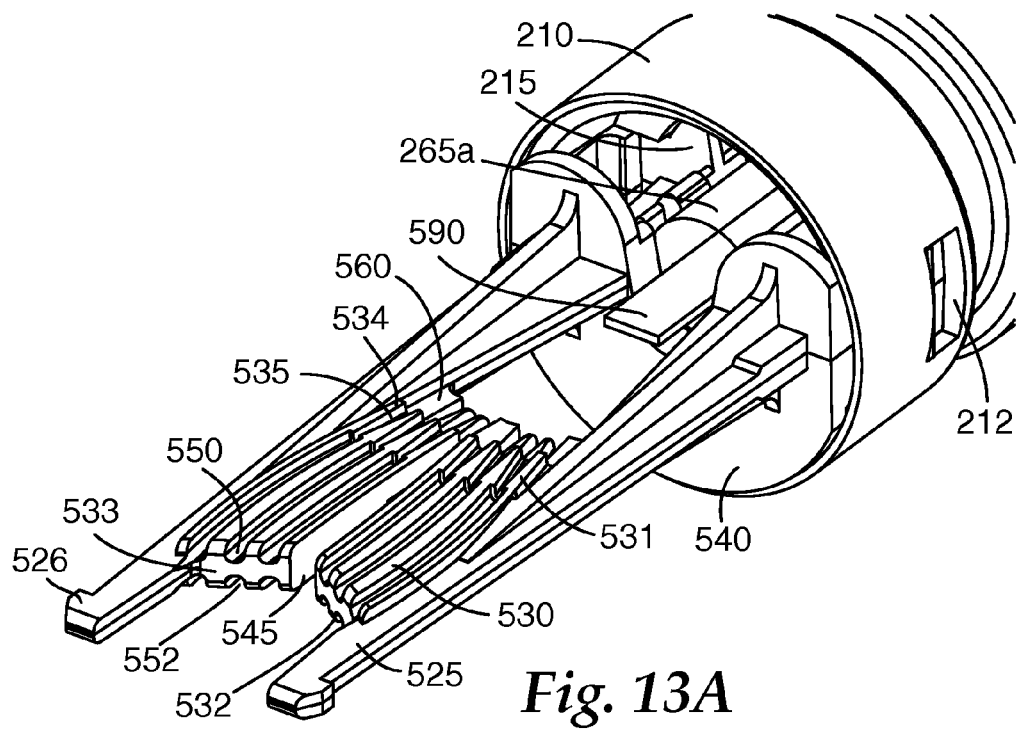
FIG. 13A shows a detailed isometric view of a multi-fiber cable fanout device according to an embodiment of the present invention.
Figure 13B:
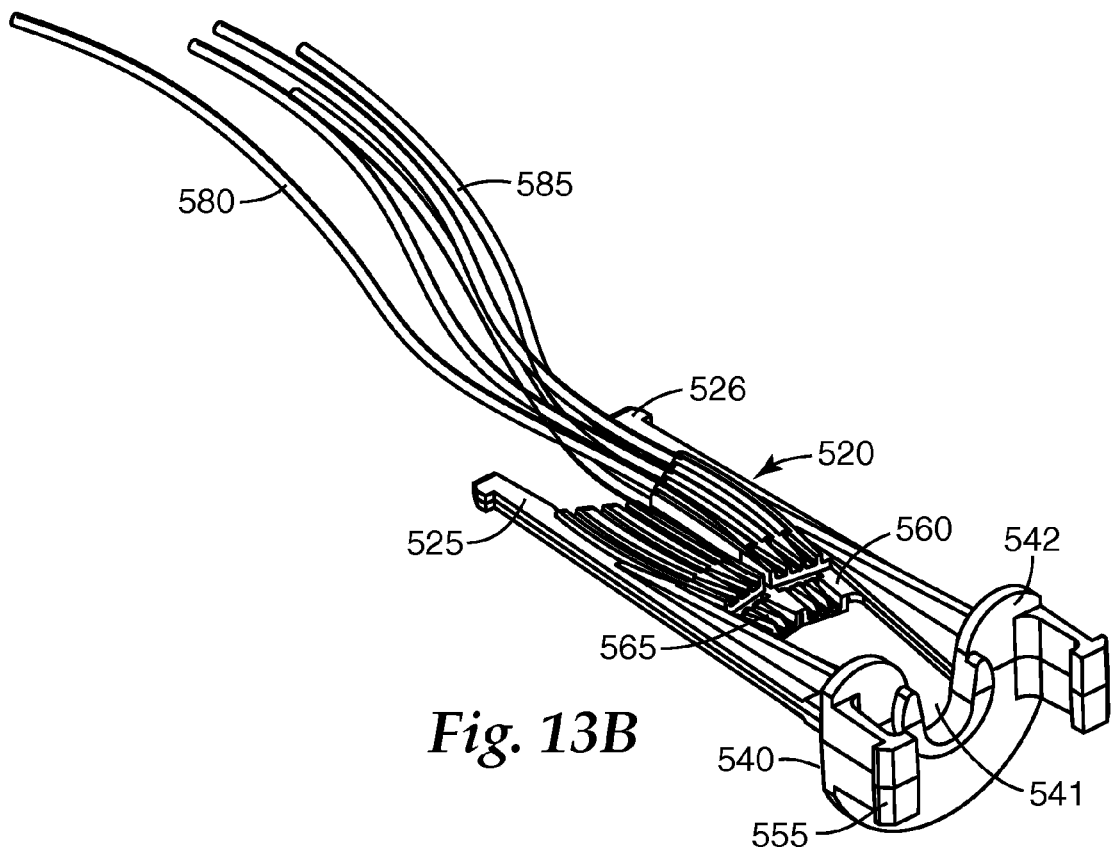
FIG. 13B shows another detailed isometric view of a multi-fiber cable fanout device according to an embodiment of the present invention.
Figure 13C:
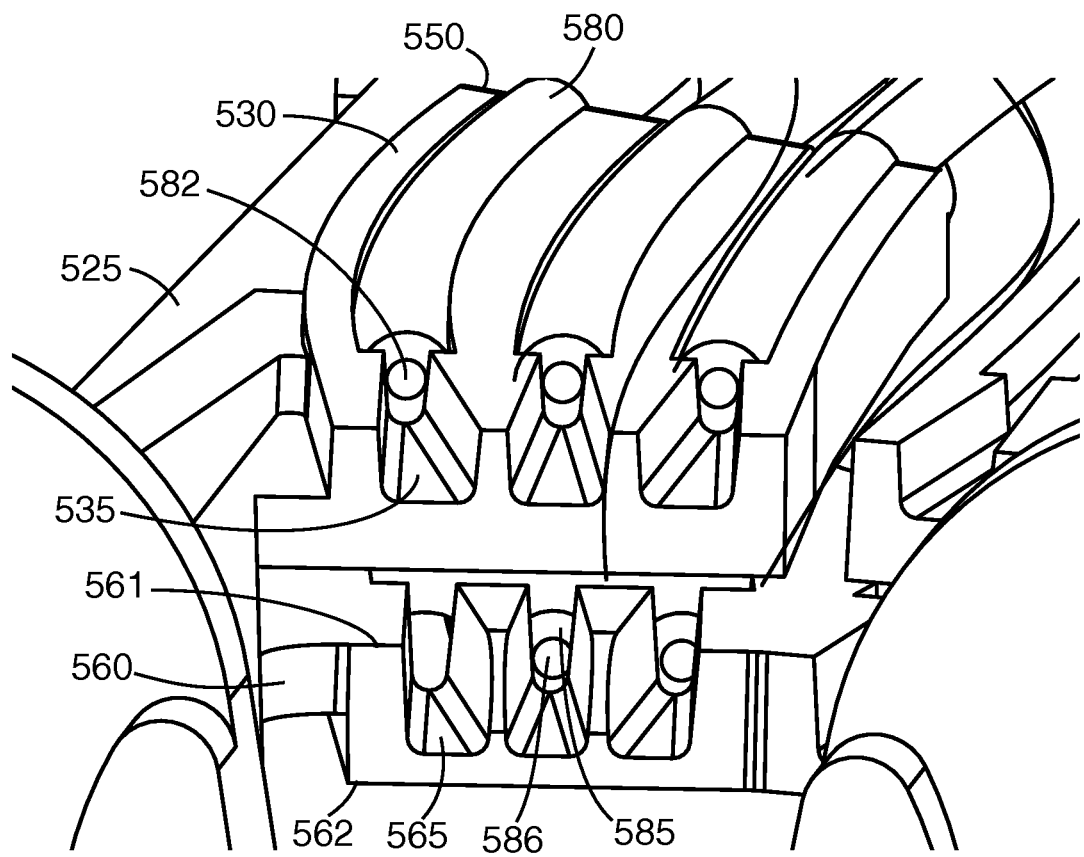
FIG. 13C shows a detailed isometric view of a multi-fiber cable fanout device according to an embodiment of the present invention.

The fanout device 520 can then be installed into the second end 210 of the unibody housing by engaging the latches 555 extending from the first side of the disc shaped base 540 with the slots 212 located on the second end of the unibody housing (see FIGS. 13A and 13B). The optical fibers can be drawn taut to straighten and align the fibers inside the passage of the unibody housing. Approximately 4 in (10.2 cm) to 6 in (15.2 cm) of the fibers should extend from the protective tubing 580, 585 to provide adequate length to terminate the fibers with optical connectors, if desired.

The tubing containing the optical fibers may be fed through a cover assembly 570 having a funnel shaped outlet 575. Once the fibers have been fed through the cover, the alignment slots 572 in the cover are aligned with the support legs 525 of the fanout device 520. The cover can be slid into place until the detents 526 at the ends of the legs engage with the pair of niches or slots 576 in the cover. An optional piece of tubing such as Tygon tubing can be slipped over the funnel shaped outlet portion of the cover to provide added strain relief to the plurality of optical fibers.

Terminating the Optical Cable Assembly

Optionally, an optical connector 30 such as an SC APC, FC, or LC connector or a combination thereof for a multi-fiber cable assembly may be mounted on the terminal end of the optical fiber using standard industry practices. For example, a conventional connector can include a remote grip connector, such as a Crimplok™ Connector available from 3M Company (St. Paul, Minn.). A Crimplok™ connector can be mounted on an optical fiber by a known method which is summarized briefly here. A connector strain relief boot and a crimp ring can be threaded onto the fiber being terminated. The connector can be seated in an actuation tool (not shown). The terminal end of the optical fiber can be stripped of its buffer coating. The fiber can then be inserted into the connector until the fiber protrudes through the end of the ferrule.

A crimping tool can be used to compress a sleeve around the protective to secure the fiber in place. Next, the actuation tool can be used to press the crimp element cap causing the crimp element to close around the bare glass fiber behind the connector ferrule. A strain relief boot slid into place to complete assembly of the connector. Any excess length of fiber can be removed leaving about 80 to 100 microns of fiber protruding from the ferrule tip to prepare the connector for polishing. The connector can then be polished using accepted techniques. Optionally, a protective dust cover (not shown) may be added to the connector to protect the fiber endface.

Alternatively, a hot melt connector may be applied to terminal end of the at least one optical fiber as described in commonly owned U.S. Pat. No. 7,147,384, incorporated by reference herein in its entirety.

Mounting the Pulling Sock

A pulling sock 800 may be fitted over the end of a cable assembly which can be a drop cable assembly as shown in FIGS. 14 and 15 to protect the inlet device 50 and the optical fibers as well as any optional connectors attached to the terminal ends of the optical fibers. The arms 821, 822 of the pulling sock can be separated. The unterminated or terminated ends of the optical fibers can be fed into the trunk 830 of the pulling sock. The inlet device (with locking key 276 in place) can be inserted until the sealing member is encompassed in the pulling sock. The arms can be then pressed together and secured in place using a pair of cable ties 826 fastened through holes 824 in the arms 821, 822 of the sock on either side of the inlet device.

If the pulling sock is to be used to pull the cable assembly through wet or dirty conduits, the sock can be spiral wrapped from about 2 in (5 cm) above the junction of the arms (i.e. on the trunk) down past the end of the cable sealing and strain relief member with a vinyl tape such as 3M™ Super 88T adhesive tape available from 3M Company (ST. Paul, Minn.).

Inserting the Inlet Device into a Telecommunications Enclosure

The inlet device 50, 150 (FIGS. 2 and 9) can be inserted into a telecommunications closure 600 (FIG. 16) having a port 626 with a complimentary structure to the orientation control section 250 of the unibody housing 200. The free end of the optical fibers, protective tubes containing the optical fibers or pre-connectorized optical fibers can be fed through the port first via its inlet passageway 611.

The inlet device 50, 150 is then inserted into the port 626 via an inlet passageway 611 until the inlet device seats in the port (i.e. when the abutment surfaces on the orientation control device contact the shoulder inside of the port). The inlet device may be rotated to align the orientation control section with the complimentary female orientation structure in the port. The sealing member on the inlet device 50 is pressed between annular channel in the unibody housing 200 and the inside wall of the passageway 611 of the port 626 of the telecommunications closure 600 to provide a seal. The second end of the unibody housing can extend into the closure such that the locking engagement feature is free to engage with the locking key 276. Once the inlet device is properly seated the locking key is slid into place into the locking engagement feature to secure the inlet device in the port of the telecommunications enclosure.

If the ends of the cable assembly include connectors, the connectors 30 may be attached to a coupling field 650 in the telecommunications enclosure as illustrated in FIGS. 17 and 18. Alternatively, if the cable assembly does not include pre-installed connectors, the craft person can elect to add field installed connectors to the end of the cable assembly before inserting the device into the telecommunications enclosure, or the craft person can splice the free-ends of the fiber in splice insert 670 (FIG. 20) and connect the fibers using either mechanical or fusion splicing depending on the chosen network architecture.

Alternatively, if the device is to be used with a telecommunications enclosure that has holes, cutouts, or knockouts 702, rather than the complimentary port structure required by the inlet device, an optional port adapter 710 can be installed prior to installation of the inlet device 50 as shown in FIGS. 21 and 22. To install the inlet device, the retainer nut 730 can be removed from the adapter body 712. The adapter body can be inserted through the hole or knockout and the retainer nut is tightened down compressing the resilient gasket 740 to form a seal.

The inlet device, described above, provides a simple and user-friendly design thereby greatly facilitating the installation of the last leg of the FTTH network to the end user. Additionally, the inlet device can require less space inside the telecommunications enclosure. Also, in some embodiments, the inlet device, when used as part of a pre-stubbed terminal, provides a connection point of the optical fibers within the terminal, as opposed to on the outer wall of the terminal. In this configuration, an additional degree of protection to the connection point of the multifiber feeder cable and the individual dropcables.

Various modifications including extending the use of the inlet device to applications with copper telecommunication cables or copper coax cables, equivalent processes, as well as numerous structures to which the present invention may be applicable will be readily apparent to those of skill in the art to which the present invention is directed upon review of the present specification.

We claim:

1. A telecommunications enclosure system comprising:
    a first optical fiber cable assembly comprising
        an optical fiber cable having at least one optical fiber and at least one strength member; and
        an inlet device mounted on at least one end of the optical fiber cable comprising
            a housing having a first end and a second end,
            the housing including a strength member securing section formed in an interior portion thereof and configured to fasten the at least one strength member of the optical fiber cable within the housing, wherein the strength member securing section comprises at least one securing well for retaining the at least one strength member disposed between the housing and an optical fiber passageway formed in the housing; and
            a fiber guide device configured to be received by the second end of the housing; and
    a telecommunications enclosure comprising a base having an opening formed therein and a cover removably securable to the base, wherein the first optical fiber cable assembly is secured in the opening in the base of the telecommunications enclosure.

2. The telecommunications enclosure system of claim 1, wherein the opening comprises a port that includes an inlet passage, wherein a portion of the inlet passage is shaped to receive a polygonal shaped orientation control section formed on a portion of an outer surface of the housing.

3. The telecommunications enclosure system of claim 1, further comprising a port adapter fitted into the opening, wherein the port adapter includes an inlet passage, wherein a portion of the inlet passage is shaped to receive a polygonal shaped orientation control section formed on a portion of an outer surface of the housing.

4. The telecommunications enclosure system of claim 1, wherein the first optical fiber cable assembly is a pre-terminated multi-fiber cable assembly comprising a multifiber inlet device mounted on a multi-fiber optical cable, wherein the multi-fiber optical cable has a plurality of optical fibers; and a plurality of optical connectors attached to terminal ends of the plurality optical fibers.

5. The telecommunications enclosure system of claim 4, further comprising a coupling field disposed in an internal cavity of the telecommunications enclosure wherein the optical connectors of the pre-terminated multi-fiber cable assembly are inserted into the coupling field.

6. The telecommunications enclosure system of claim 5, further comprising a pre-terminated drop cable assembly connected to the pre-terminated multi-fiber cable assembly by the coupling field.

7. The telecommunications enclosure system of claim 5, further comprising a single fiber cable assembly spliced to a connectorized pigtail fiber, wherein the pigtail fiber is connected to the pre-terminated multi-fiber cable assembly by the coupling field.

8. The telecommunications enclosure system of claim 1, wherein the first optical fiber cable assembly is a pre-terminated drop cable assembly having at least one optical connector connected to the at least one optical fiber.

9. The telecommunication enclosure system of claim 1, wherein the first optical fiber cable assembly is a single fiber cable assembly wherein the single fiber cable assembly is connected to an input portion of an optical device module to separate a signal carried on the optical fiber for distribution to a plurality of drop cable assemblies attached to an output portion of the optical device module.

10. The telecommunications enclosure system of claim 1, wherein the fiber guide device of the inlet device comprises a multi-fiber fanout device comprising
    a base; and
    a guide support having a front side and a back side extending from the base;
    wherein the guide support comprises a plurality of fiber guiding channels wherein a first set of the fiber guiding channels is disposed on the front side of the guide support; and
    wherein each fiber guiding channel of the first set includes a funnel shaped entrance channel portion and an open channel portion.

11. The telecommunications enclosure system of claim 1, further including a support frame secured to the base.

12. The telecommunications enclosure system of claim 11, further including a coupling field installed in a bracket attached to the support frame.

13. The telecommunications enclosure system of claim 1, wherein the telecommunications enclosure is an optical network terminal.

14. The telecommunications enclosure system of claim 1, wherein the housing of the inlet device comprises a unibody structure that includes the strength member securing section, a orientation control section formed on an outer surface of the unibody structure, an annular channel to receive a sealing member formed in the outer surface of the unibody structure, a lock engagement feature formed in the outer surface of the unibody structure, and a fiber guide receptacle formed in a second end of the unibody structure.

15. The telecommunications enclosure system of claim 1, further comprising a port adapter assembly fitted into at least first and second openings in an outer wall of the telecommunications enclosure wherein the port adapter assembly includes a body portion having at least first and second ports mateable with the at least first and second openings of the telecommunication enclosure.

16. The telecommunications enclosure system of claim 15, wherein the port adapter assembly further includes a reinforcing plate to attach the body portion to the outer wall.

* * * * *

UNITED STATES PATENT AND TRADEMARK OFFICE
CERTIFICATE OF CORRECTION

| | |
|---|---|
| PATENT NO. | : 8,879,883 B2 |
| APPLICATION NO. | : 12/527995 |
| DATED | : November 4, 2014 |
| INVENTOR(S) | : Rutesh Parikh |

It is certified that error appears in the above-identified patent and that said Letters Patent is hereby corrected as shown below:

On the Title Page,
Item [74], delete "King" and insert -- Kling -- therefor.

In the Specification,
Column 1,
Line 9, delete "2007" and insert -- 2008 -- therefor.

Column 21,
Line 37, delete "Henkle" and insert -- Henkel -- therefor.

Column 24,
Line 5, delete "maybe" and insert -- may be -- therefor.

In the Claims,
Column 27,
Line 3, after "plurality" insert -- of --.
Line 6, after "wherein" delete "the".
Line 23, delete "telecommunication" and insert -- telecommunications -- therefor.

Signed and Sealed this
Twenty-eighth Day of July, 2015

Michelle K. Lee
*Director of the United States Patent and Trademark Office*